United States Patent [19]
Gassmann

[11] Patent Number: 5,632,185
[45] Date of Patent: May 27, 1997

[54] AXLE DRIVE FOR DISTRIBUTING TORQUE

[75] Inventor: Theodor Gassmann, Siegburg, Germany

[73] Assignee: GKN Viscodrive GmbH, Lohmar, Germany

[21] Appl. No.: 569,681

[22] Filed: Dec. 8, 1995

[30] Foreign Application Priority Data

Dec. 10, 1994 [DE] Germany ............... 44 44 027.8

[51] Int. Cl.$^6$ .................. F16H 48/12; F16D 25/10
[52] U.S. Cl. ............... 74/650; 192/48.8; 192/87.11; 192/87.12; 192/103 F
[58] Field of Search .............. 192/87.12, 87.11, 192/87.1, 50, 48.8, 57, 58.42, 103 F; 74/650

[56] References Cited

U.S. PATENT DOCUMENTS

| | | |
|---|---|---|
| 4,012,968 | 3/1977 | Kelbel . |
| 4,058,027 | 11/1977 | Webb . |
| 4,224,838 | 9/1980 | Roushdy et al. . |
| 4,836,051 | 6/1989 | Guimbretiere . |
| 4,905,808 | 3/1990 | Tomita et al. . |
| 4,960,011 | 10/1990 | Asano ..................... 74/650 |

(List continued on next page.)

FOREIGN PATENT DOCUMENTS

| | | |
|---|---|---|
| 0247008 | 5/1987 | European Pat. Off. . |
| 0347165 | 6/1989 | European Pat. Off. . |
| 480175 | 9/1991 | European Pat. Off. . |
| 0549828 | 12/1991 | European Pat. Off. . |
| 0639730 | 8/1994 | European Pat. Off. . |
| 938813 | 7/1949 | Germany . |

(List continued on next page.)

*Primary Examiner*—Rodney H. Bonck
*Attorney, Agent, or Firm*—Dinnin & Dunn, P.C.

[57] ABSTRACT

An axle drive for distributing torque from a propeller shaft to two axle shafts of a motor vehicle axle which is not permanently driven, having two torque transmitting friction couplings which are arranged in the coupling housing and intended to drive the axle shafts, and having two actuating devices for the two friction couplings. There is provided a common pump housing which is non-rotatably connected to the coupling housing and which contains two symmetrically and axially movably arranged pistons delimiting one end of pressure chambers each filled with a highly viscous fluid and connected to a reservoir. Pumping and control members are arranged opposite the pump housing between two end positions so as to be rotatable to a limited extent. The pressure chambers each contain conveying members which are each non-rotatably connected to one of the axle shafts. Rotational faces of a conveying member, together with counter-faces of the pumping and control member, constitute at least one sealed shear channel. In the two end positions of a pumping and control member, one control aperture arranged in the direction of relative rotation at the front end of the groove communicates with the reservoir and a control aperture arranged in the direction of relative rotation at the rear end of the groove communicates with the pressure chamber, so that in the shear channel there occurs a shear action from the reservoir to the pressure chamber.

21 Claims, 18 Drawing Sheets

U.S. PATENT DOCUMENTS

| | | |
|---|---|---|
| 4,966,268 | 10/1990 | Asano et al. . |
| 4,982,808 | 1/1991 | Taureg et al. . |
| 5,007,515 | 4/1991 | Shimizu . |
| 5,007,885 | 4/1991 | Yamamoto et al. . |
| 5,012,908 | 5/1991 | Kobayashi et al. ............... 192/58.42 X |
| 5,031,743 | 7/1991 | Morishita et al. . |
| 5,036,963 | 8/1991 | Murata . |
| 5,056,640 | 10/1991 | Yamamoto . |
| 5,063,738 | 11/1991 | Asano et al. . |
| 5,070,975 | 12/1991 | Tanaka et al. . |
| 5,080,187 | 1/1992 | Asano et al. . |
| 5,127,503 | 7/1992 | Gratzer . |
| 5,129,870 | 7/1992 | Pierce . |
| 5,178,249 | 1/1993 | Haga et al. ............................ 192/57 X |
| 5,197,583 | 3/1993 | Sakai et al. . |
| 5,259,488 | 11/1993 | Oberdorster et al. . |
| 5,261,862 | 11/1993 | Pierce . |
| 5,267,916 | 12/1993 | Beim et al. . |

FOREIGN PATENT DOCUMENTS

| | | |
|---|---|---|
| 4103054 | 8/1991 | Germany . |
| 4032245 | 3/1992 | Germany . |
| 64-87928 | 4/1989 | Japan . |
| 1126440 | 5/1989 | Japan . |
| 1-220728 | 9/1989 | Japan . |
| 2-51626 | 2/1990 | Japan . |
| 2-120529 | 5/1990 | Japan . |
| 2-120530 | 5/1990 | Japan . |
| 337455 | 2/1991 | Japan . |
| 3-69829 | 3/1991 | Japan . |
| 2202602 | 9/1988 | United Kingdom . |
| 2222232 | 2/1990 | United Kingdom . |

A-A

AXLE DRIVE FOR DISTRIBUTING TORQUE

BACKGROUND OF THE INVENTION

The invention relates to an axle drive for distributing torque from a propeller shaft to two axle shafts of a motor vehicle axle which is not driven permanently, having a coupling housing which is drivable by the propeller shaft and which is rotatably supported in a drive housing, and having two torque transmitting friction couplings which are provided to drive the axle shafts and which are arranged in the coupling housing, with first friction plates of each coupling being non-rotatably connected to the coupling housing and second friction plates of each coupling being non-rotatably connected to the respective axle shaft, and having actuating devices for the two friction couplings.

Drives of this type which, by means of a double coupling, transmit torque in motor vehicles are known from DE 40 21 747 C2. Actuation is effected by one single common actuating device which subjects the two friction couplings to the same loads and which has to be provided with an external energy supply and an external control device. This system, admittedly, makes it possible to control the double couplings independently of the most varied operating parameters, but it requires additional facilities and expenditure as compared to using mechanical self-locking differential drives, which is not always acceptable.

DE 38 21 773 A1 proposes an axle drive of a similar type which, however, as compared to the above-described drive, is provided with two separate external actuating devices for the two friction couplings. In this case, too, operation can be effected independently of very varied operating parameters, with the conversion system additionally including an improved individual locking effect for the two friction couplings. In consequence, the expenditure required for providing energy supply and control means is doubled accordingly.

Assemblies of a similar design are known as so-called twin viscous couplings wherein, however, instead of the friction couplings, there are used prior art viscous couplings arranged in a common housing, and for each of the two axle shafts there is incorporated a locking effect relative to the coupling housing, which locking effect occurs automatically and involves a speed sensing system. This assembly, in respect of design, is simplified as compared to the above-mentioned drives and comprises the advantages of a locking effect which is independent of the differential speed, but as compared to drives with mechanical friction couplings, its performance density is relatively low and it is disadvantageous in that the locking effects at the two axle shafts are independent of one another.

SUMMARY OF THE INVENTION

It is therefore the object of the present invention to provide a drive of the initially mentioned type with automatically operating actuating devices which permit different locking characteristics.

The objective is achieved in that the actuating devices are characterized by the following features:

that there is provided a common pump housing which is non-rotatably connected to the coupling housing;

that two symmetrically arranged pistons are axially movably provided in the pump housing and delimit one end of each pressure chamber which is filled with a highly viscous fluid and connected to a reservoir;

that the pressure chambers each contain pumping and control members which are rotatable to a limited extent relative to the pump housing between two end positions and that in each of the pressure chambers there are arranged conveying members which are each non-rotatably connected to one of the axle shafts;

that respective rotational faces of a conveying member, together with counter faces of a pumping and control member, constitute at least one sealed shear channel which is formed by a groove extending circumferentially between two ends in the pumping and control member and by a surface of the conveying member covering same;

that the reservoir contained in the pump housing is connectable to the respective pressure chamber by means of suction channels and pressure channels arranged in the pump housing and by means of control apertures respectively arranged at the ends of the groove in the pumping and control member in such a way that in both the two end positions of a pumping and control member, the respective control aperture arranged in the direction of relative rotation at the front end of the groove communicates with the reservoir, and the control aperture arranged in the direction of relative rotation at the rear end of the groove communicates with the pressure chamber, so that in the shear channel a conveying action takes place from the reservoir to the pressure chamber.

In this way there is provided a new type of actuating devices for the friction couplings of the initially mentioned type of drive. Its functioning is based on a pressure build-up which is high even at a low relative speed between the coupling housing and an axle shaft and which is suitable for actuating a mechanical friction coupling. By providing different mechanical and hydraulic coupling facilities between the two actuating devices, it is possible to achieve different drive characteristics which will be described later. The mode of operation of the two actuating devices in cooperation with their respective friction coupling will initially be described in principle.

The operation of the actuating devices is based on an operating principle referred to as pressure drag flow, which, in turn, is based on the shearing action of a viscous medium between two plates moved relative to one another. In the case of such a relative movement, part of the medium—in each case with reference to one of the plates—is conveyed in the direction of the movement of the other one of the plates. If, substantially parallel to the relative direction of movement, a gap between two plates is laterally closed in the form of a groove in one of the plates and covered by the surface of the other plate which is movable in the direction of the groove, there is produced a shear channel in which, as a function of the magnitude and direction of the relative movement, fluid is conveyed from the one end of the shear channel produced in this way to its other end. The conveying pressure is directly proportional to the length of the shear channel, to the viscosity of the sheared medium and to the shear rate; i.e., to the relative speed of the two parts. If said shear channel is suitably arranged in such a way that it connects two chambers to one another and that the two plates forming the shear channel are connected to the one and the other of the rotating parts of a coupling, there is generated a pressure which depends on the differential speed and which can be used by increasing the pressure in a pressure chamber, said pressure acting on at least one piston which loads the friction elements of a friction coupling.

Independently of the relative direction of rotation of the parts relative to one another, the shear channel is used by being reversed for the purpose of generating pressure in each direction of relative rotation. In an advantageous way it is proposed that, at the moment of reversal, the shear channel end previously used for applying pressure is directly connected to the reservoir so that the pressure at this end does not have to be decreased along the entire length of the shear channel.

To achieve assembly characteristics differing as a function of the direction of rotation, it is proposed that in one of the two directions of relative rotation of the parts rotatable relative to one another, only part of the length of the shear channel is used for the pressure build-up by providing an additional connection from the reservoir to the shear channel at one point between its two ends, which connection is open in only one direction of relative rotation and closed in the second direction of relative rotation.

Furthermore, it is proposed that to achieve assembly characteristics which differ as a function of the direction of rotation, in one of the two directions of relative rotation there is additionally provided a direct connection between a point positioned between the ends of the shear channel and the pressure chamber in order to shorten the shear channel length used for the pressure build-up, which connection is closed in the opposite direction of relative rotation.

The shear channel is formed by a circumferentially extending groove in one of the rotational faces of the pumping and control member and by a complementary contacting surface of the conveying member rotatable relative thereto.

It is important to provide spring means for pressing the conveying member and pumping and control member axially together to ensure that the shear channel remains closed and that the pressure acts on the piston.

The reservoir may be formed by the pump housing and an axially movable, spring-loaded piston rotating therewith or a spring-loaded membrane, or it may comprise a resilient compensation element in a chamber forming the reservoir. The viscous fluid contained therein may be a dilatant medium, for example, whose viscosity increases as a function of the shear rate.

Furthermore, it is proposed that the control apertures at the ends of the grooves are provided in the form of axial bores in the disc-shaped pumping and control members, which each extend from their one end face which, at least in the region of the apertures, sealingly rests against an end housing wall of a chamber in the pump housing, to their groove positioned in the opposed second end face, with said second end face sealingly contacting a radial end face of the conveying member.

A further design measure proposed consists in that the connecting channels from the reservoir to the pressure chamber are provided in the form of radial grooves in said end wall of the pump housing, and that in each end position of the pumping and control member, only one of the control apertures overlaps with a connecting channel to the reservoir, with one of the control apertures overlapping with a connecting channel to the pressure chamber.

To achieve characteristics which differ as a function of the direction of rotation, it is possible to provide a further control aperture in the form of an axial bore in each of the disc-shaped pumping and control members, which control aperture is positioned at a point between the ends of the pumping and control member of the grooves and which, in only one of the end positions, overlaps with an additional connecting channel leading to the reservoir.

The same purpose is served by an embodiment wherein there is provided a further control aperture in the form of an axial bore in each of the disc-shaped pumping and control members, which further control aperture ends at a point between the ends of the grooves and which, in only one of the end positions of the pumping and control member, overlaps with an additional radial connecting channel leading to the pressure chamber and formed as a radial groove in the rotational housing.

The two embodiments make it possible to achieve a locking effect in the coupling only in one direction of relative rotation between the coupling housing and axle shafts, whereas in the opposed direction of relative rotation a freewheeling characteristic is achieved. The purpose is to achieve a locking effect for rear wheels which lag behind relative to the rotational speed of the rigidly driven front wheels of a vehicle and which are driven by the coupling, whereas in the case of rear wheels whose rotational speed is greater than that of braked or blocked front wheels, it is possible to disconnect the drive line and axle shafts by avoiding a locking effect.

The above-mentioned relative rotatability of the pumping and control members may be limited in that a stopping lug at the pumping and control members engages a groove in the rotational housing, which groove is limited in respect of its circumferential length and which acts as a rotational stop.

Depending on the required curve of the locking effect generated by the friction coupling as a function of the differential speed, it is possible to correct the effective piston forces. For this purpose it is possible to provide spring means which, in a pretensioned condition, are supported on the coupling housing and load the pistons at the end facing the plates; i.e., against the effect of the pressure chamber, the objective being to build up a locking effect as from a certain differential speed onwards only, which has a positive effect on the consumption values of the vehicle concerned.

BRIEF DESCRIPTION OF THE DRAWINGS

To explain the operating principle involved and to illustrate preferred embodiments, reference is made below to the drawings wherein:

FIG. 3b is a diagram showing the operating principle of a device according to FIG. 3a.

FIG. 4b is a diagram showing the operating principle of a device according to FIG. 4a.

FIG. 5b is a diagram showing the operating principle of a device according to FIG. 5a.

DESCRIPTION OF THE PREFERRED EMBODIMENTS

Figure 1:
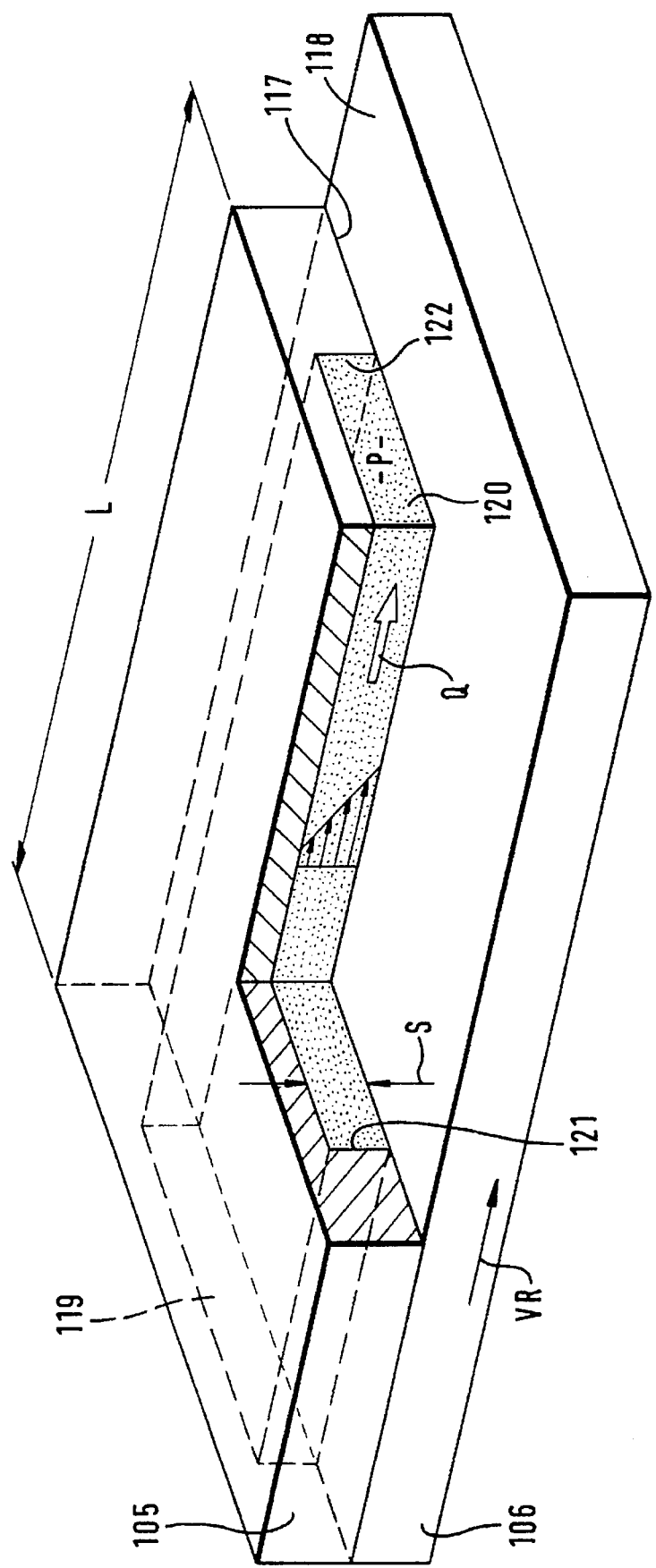
FIG. 1 is a cut-out view of two plates which are movable relative to one another and between which there is formed a shear groove.

FIG. 1 is a view of a cut-out of a first disc 105 which corresponds to a pumping and control member which will be explained later and of a second disc 106 which corresponds to a conveying member to be described later. The end faces 117, 118 of the disc contact one another. The first disc 105 is assumed to be stationary, and the second disc 106 moves relative to the first one at a speed VR. In the end face 117 of the first disc 105 there is formed a groove 119 comprising a rectangular cross-section and side walls 121, 122. The end face 118 and the groove 119 form a shear channel 120 which accommodates a viscous medium. The shear channel 120 which, in the embodiments shown, extends along a circular line has the length L and the thickness S. When the conveying disc 106 moves, the viscous medium in the shear channel behaves in accordance with the illustrated linear speed profile which refers to the fixed pumping and control disc 105. At the surfaces of the two discs there exist adhesion conditions. At the right-hand end of the shear channel 120 there occurs a quantity flow Q which leads to the build-up of a pressure P.

Figure 2A:
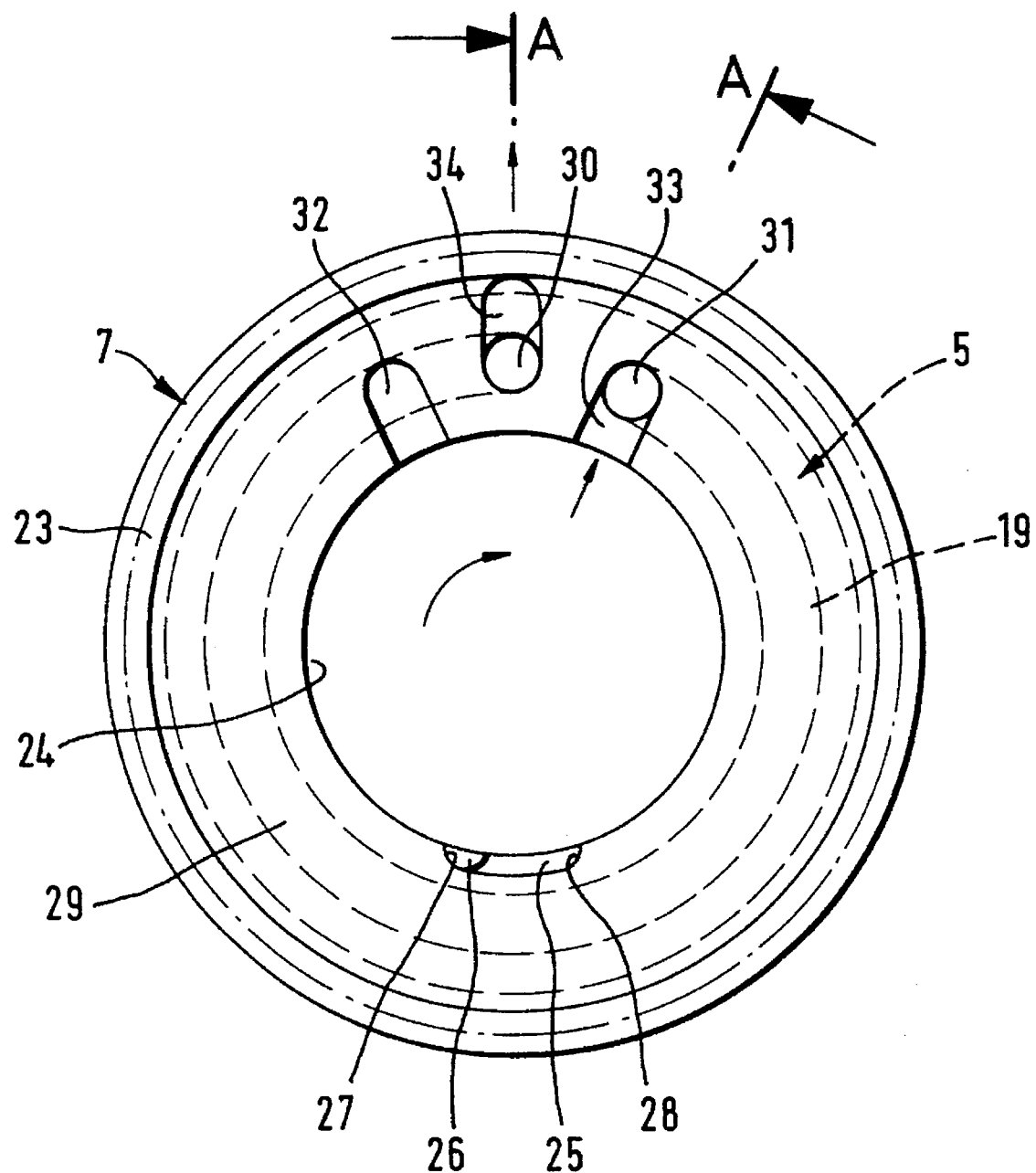
FIG. 2a is a plan view of part of a pump housing with a pumping and control member arranged therebehind and associated with an actuating device in accordance with the invention.

FIG. 2a shows part of a pump housing 7 with a pumping and control member 5 arranged therebehind. The pump housing comprises an outer cylindrical wall 23 delimiting a pressure chamber which is closed by a piston and which will be described later. The wall of an inner aperture 24 delimits a reservoir or balancing chamber to be explained later. Furthermore, the pump housing 7 comprises a radial housing wall 29 which, inside, adjoins the cylindrical wall 23 and in which there is formed a limited circumferential groove 25 which is engaged by a projection 26 provided at the pumping and control member 5 and thus permitting a circumferential movement of the pumping and control member 5 relative to the pump housing 7 by a limited circumferential angle between two stops 27, 28 at the ends of the circumferential groove 25. A rotational force acting on the pumping and control member 5 in the one or other direction and causing the projection 26 alternately to stop against the stops 27 or 28 is generated by a conveying member—which is not illustrated in this case and which rotates relative to the pumping and control member—as a result of surface friction forces and/or fluid friction forces. In the respective stopping positions, the pumping and control member may be regarded as stationary, as described with reference to FIG. 1, whereas the conveying disc moves relative thereto.

In the pumping and control disc 5 there is illustrated in dashed lines a circumferential groove 19 which is positioned at the rear end of the pumping and control disc facing away from the radial housing wall 29, with the pumping and control disc being illustrated so as to be covered. The circumferential groove 19 extends over a relatively large circumferential angle of 335° and ends in axial control apertures 30, 31, i.e. suction and pumping apertures, passing through the pumping and control disc 5. The angular distance between said apertures 30, 31 corresponds to the circumferential angle of the circumferential groove 25.

In the radial housing wall 29, there are provided first radial channels 32, 33 in the form of suction channels which point towards the contacting planar surface of the pumping and control disc 5, which extend radially inwardly as far as the inner recess 24 and which are each able to connect one of the control apertures 30, 31 of the circumferential groove 19 to the reservoir. Furthermore, the same surface of the radial housing wall 29 is provided with a radial channel 34 constituting a pressure channel which is able to connect the respective other one of the two control apertures 30, 31 to a pressure chamber partially radially enclosing the pumping and control disc 5. The angular distances between each one of the radial channels 32, 33 and the radial channel 34 positioned centrally therebetween corresponds to the angular distance between the control apertures 30, 31 and to the circumferential angle of the circumferential groove 25.

In each direction of relative rotation of the conveying disc relative to the pumping and control disc 5, the latter is adjusted in such a way that through one of the suction channels 32, 33 and through one of the respective control apertures 30, 31, the shear channel is supplied with fluid from the reservoir and that through the other one of the control apertures 30, 31 and through the pressure channel 34 the respective pressure chamber is loaded with pressure from the shear channel. The function explained so far refers to channels 32, 33, 34 which are positioned so as to point towards the pumping and control disc 5 identifiable at the rear of the radial housing wall 29. However, identical channels are shown in a plan view because in each pump housing 7 there are provided two identical actuating devices with symmetrically arranged pumping and control discs 5 and conveying discs.

The position of the pumping and control disc 5 as illustrated in the Figure results from the direction of rotation, indicated by the respective arrow, of the respective conveying disc (not illustrated) which, again, is positioned behind the pumping and control disc 5 covered by the housing wall 29. This leads to the function, indicated by radial arrows, of the control aperture 31 as a suction aperture positioned at the front of the groove in the direction of relative rotation and the function of the control aperture 30 as a pumping aperture positioned at the rear of the groove in the direction of relative rotation. The suction channel 33 and pressure channel 34 are carrying out a function, i.e. they are in connection with the groove, whereas the suction channel 32 is without a function.

Figure 2B:
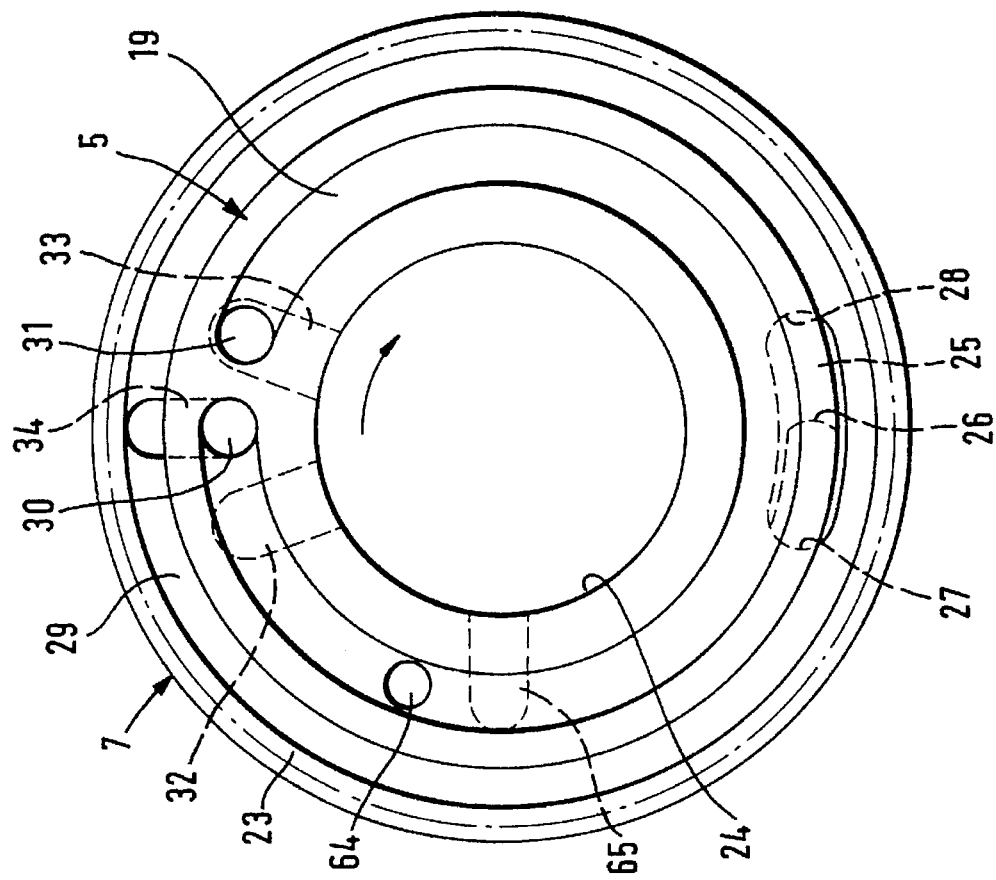
FIG. 2b is a plan view of a first modified embodiment of a pumping and control member with a contacting end housing wall, in two positions.
Figure 2B:
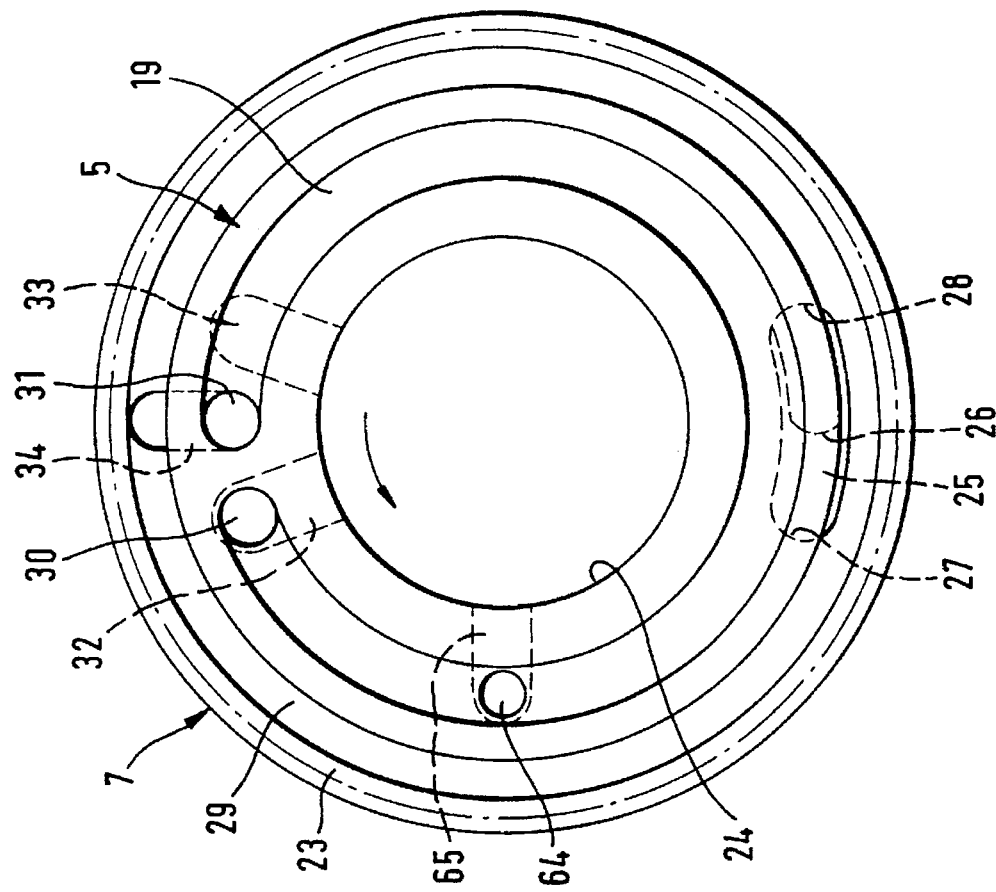

FIG. 2b shows an axial view of part of a pump housing 7 with a pumping and control member 5 positioned in the front thereof, in two different positions, in an embodiment which is modified as compared to FIG. 2a. To the extent that the respective details correspond to one another, they are given the same reference numbers. To that extent, reference is made to the above description.

In addition, the pumping and control member 5, in the groove 19, comprises an additional control aperture 64 which is positioned between the two control apertures 30 and 31. Furthermore, the pump housing 7, in the housing wall 29, comprises an additional connecting channel 65'. In the case of the position of the rotational stop 26 in the circumferentially limited groove 25 and thus of the position of the pumping and control member 5 relative to the pump housing 7—which positions are illustrated on the left and deviate from FIG. 2a—said connecting channel 65' overlaps with the control aperture 64. In this way, an effective pressure build-up does not take place along the entire length of the shear channel, but only over the angular range between the control aperture 64 and the control aperture 31, with a lower pressure existing at the pressure channel 34. In the case of the opposed direction of relative rotation of the rotational member relative to the pump housing, in the position of the pumping and control member 5 relative to the pump housing 7 as illustrated on the right—the control aperture 64 and the connecting channel 65 are offset relative to one another, so that the pressure builds up along the entire length of the shear channel from the control aperture 31 to the control aperture 30, which leads to a higher pressure at the pressure channel 34.

Figure 2C:
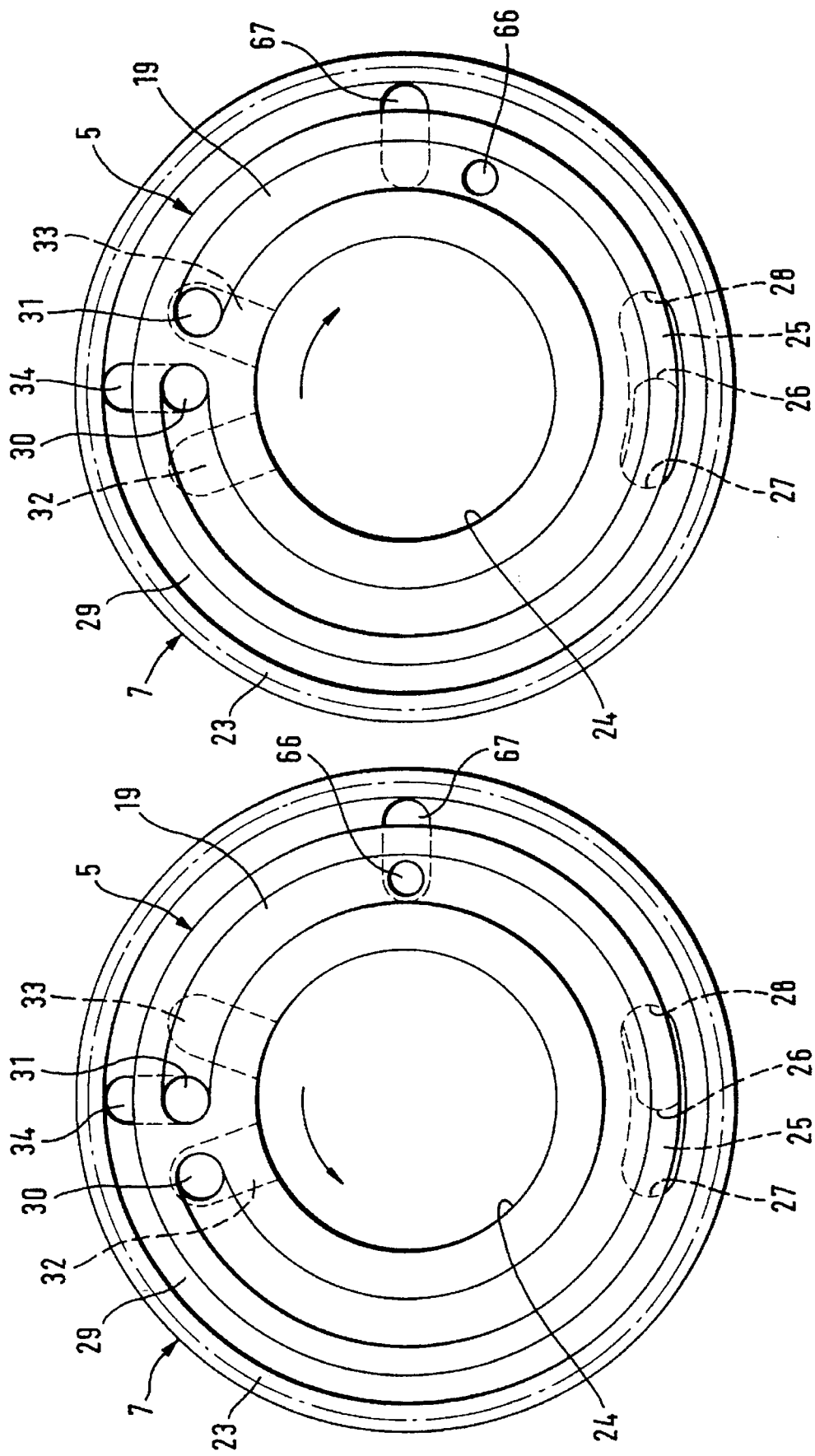
FIG. 2c is a plan view of a second modified embodiment of a pumping and control member with a contacting end housing wall, in two positions.

FIG. 2c shows an axial view of part of a pump housing 7 with a pumping and control member 5 positioned in the front thereof, in two different positions in a further embodiment modified relative to FIG. 2a. To the extent that the respective details correspond to one another, they have been given identical reference numbers. To that extent, reference is made to the above description.

In addition, the pumping and control disc 5 comprises an additional control aperture 66 and the pump housing 7, in the housing wall 29, an additional connecting channel 67. In the position of the rotational stop 26 in the circumferentially limited groove 25 and thus of the position of the pumping and control member 5 relative to the pump housing 7, which positions are illustrated on the left and deviate from FIG. 2a, the control aperture 66 and the connecting channel 67 overlap. In this way, the pressure build-up in the shear channel takes place only over an angular range from the control aperture 30 connected to the reservoir by the connecting channel 32 to the control aperture 66 and the connecting channel 67 which ends in the pressure chamber. The remaining angular range from the control aperture 66 to the control aperture 31 overlapping with the connecting channel 34 is not effective; i.e., the pressure build-up in this direction of relative rotation between the rotational member and the pump housing is lower than in the opposed direction of relative rotation illustrated on the right, wherein the control aperture 66 and the connecting channel 67 are offset relative to one another and do not become effective, so that the pressure build-up takes place along the entire length of the shear channel from the control aperture 31 to the control aperture 30, which leads to a higher pressure at the pressure channel.

In FIGS. 2b, 2c, the respective conveying disc which covers the shear channel by means of a planar end face and whose direction of relative rotation is indicated by the rotational arrow would be positioned in front of the respective pumping and control member 5; but it is not illustrated.

According to a first alternative, the channels 32, 33, 34 may be provided in the form of grooves in the surfaces of the housing wall 29, with the supply of the shear grooves from the reservoir and especially the pressure build-up in the pressure chambers being effected separately for both devices. Alternatively, the channels 32, 33, 34 may be provided in the form of open apertures in the housing wall 29, said apertures connecting the reservoir to the two shear grooves and also the two pressure chambers to one another hydraulically.

The design of one single reservoir and the corresponding design of the channels 32 and 33 in the form of open apertures in the wall 29 are given preference in the illustration of the embodiments. Separate balancing chambers or reservoirs are not provided. The embodiments contain both mutually sealed pressure chambers provided in the form of radial channels 34 formed as grooves in the surfaces of the housing wall 29 and hydraulically coupled pressure chambers provided in the form of radial channels 34 formed as open apertures in the housing wall 29.

To the extent that the below-described devices, because of their largely symmetric design, comprise two sets of parts arranged symmetrically relative to one another, these are only once provided with reference numbers in the respective sectional illustrations. However, in the diagrams showing the operating principles, they are given the said reference numbers on the one hand and the same reference numbers with the index "a" on the other hand, but as a rule, in the following description, they will be described only jointly by using the corresponding reference numbers. The section line a—a in FIG. 2a designates the position of the section through the channels in the following Figures.

Figure 3A:
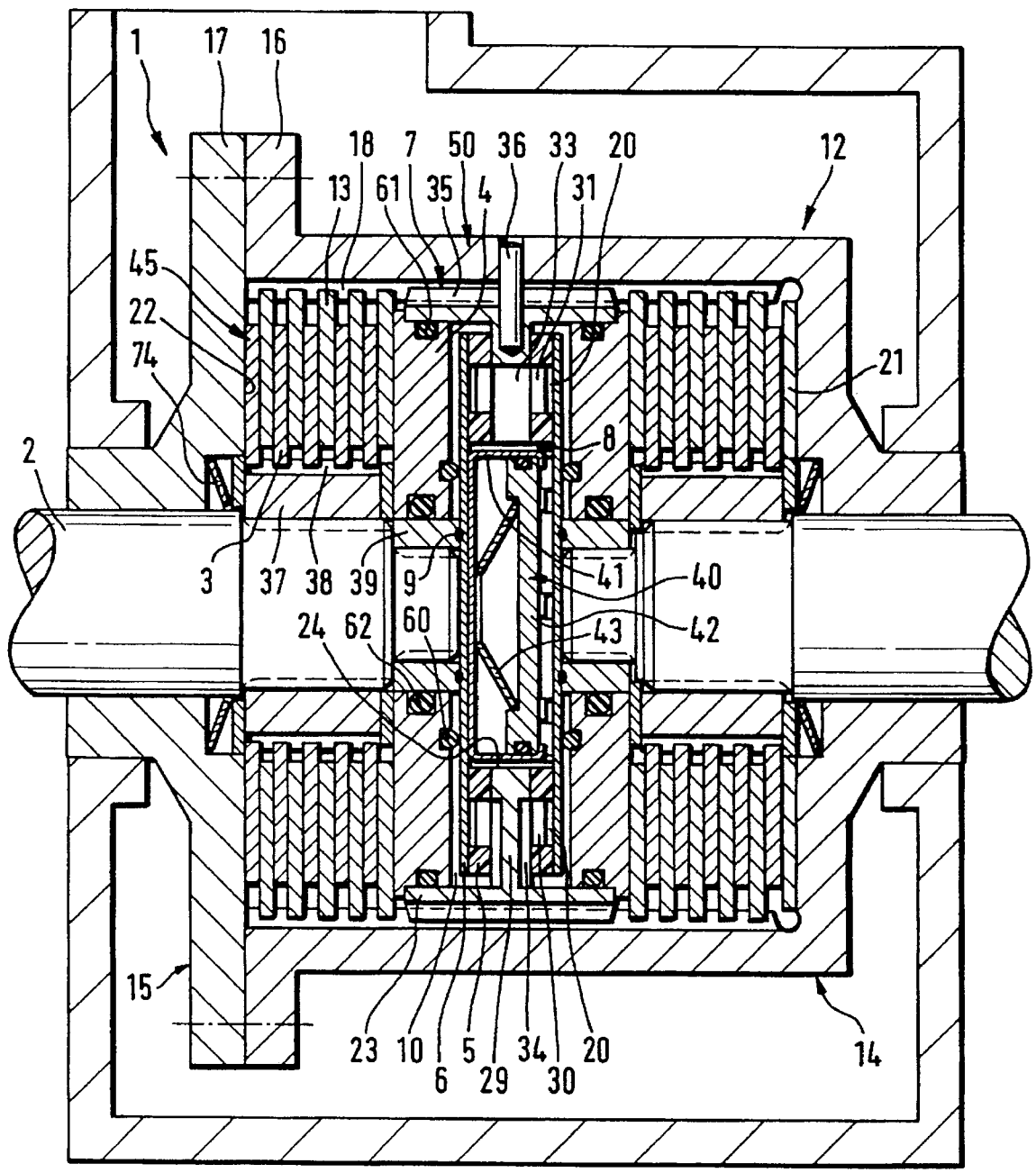
FIG. 3a shows an axial section of a first embodiment of a device in accordance with the invention.

FIG. 3a shows a device in accordance with the invention which comprises a coupling housing 12 consisting of a carrier 14 and a cover 15. In the region of the flanges 16, 17, there is shown a bolted connection. Said flanges may be used to secure a driving pinion by means of which the coupling housing may be rotatingly driven by a propeller shaft. In consequence, it is appreciated that the illustrated coupling housing 12, in turn, is rotatably supported in the housing of an axle drive. Said carrier 14 comprises multiple-function continuous inner longitudinal toothing 18. On the one hand, said longitudinal inner toothing 18 non-rotatably and longitudinally movably holds outer friction plates 13 in the coupling housing. On the other hand, a pump housing 7 is non-rotatably held in the coupling housing 12 by outer toothing 35. In the embodiment shown, the pump housing 7 is axially secured relative to the coupling housing 12 by a pin 36.

In the coupling housing 12, there are rotatably held two axle shafts 2 which, at their ends, comprise first hubs 37 with outer toothing 38 which non-rotatably and axially movably holds inner plates 3. As usual, the inner plates 3 engage the outer plates 13 in pairs. The friction couplings as such have been given the reference number 45.

The friction couplings 45 are each axially loaded by actuating devices 50 by means of pistons 4 and are supported on the inner wall 22 of the cover 15 on the one hand and on an additional stop disc 21 in the carrier 14 on the other hand. The pistons 4, together with the common pump housing 7, delimit pressure chambers 10 wherein pumping and control members 5 and conveying members 6 contact the above-mentioned common radial housing wall 29. By means of smaller hubs 39 which are also positioned on the axle shafts 2, the conveying members 6 are non-rotatably connected to the axle shafts 2. The conveying members 6 are attached to the hubs 39 by means of a weld 9. Furthermore, there are shown O-rings which constitute spring means and which ensure close contact between the conveying members 6 and the pumping and control members 5 and between the latter and the radial housing wall 29. The pistons 4 are sealed by further O-rings 61 relative to the pump housing 7 and the hubs 39. In the radial housing wall 29 there is visible one of the channels 32, 33 provided in the form of an aperture and overlapping with one of the apertures 30, 31 for the purpose of connecting the reservoir 8 to the shear channel 20. Furthermore, the wall 29 comprises the pressure channels 34 which overlap with the other one of the apertures 30, 31 and establish the connection between the shear channel 20 and the pressure chambers 10. Inside the reservoir 8, there is provided a volume balancing element 40 consisting of a housing 41, a piston 42 and a plate spring 43. Said volume balancing element 40 ensures that the pressure chambers are filled uniformly when the volume changes due to an axial displacement of the pistons 4. The pistons 4 extend around the pump housing 7.

As a result of the above-described functions of the pumping and control discs 5, the conveying discs 6, the shear channel 20 and the apertures 30, 31 in the discs 5 and of the channels 32, 33, 34 in the housing wall 29, it is ensured that with every relative rotation of one of the axle shafts 2 relative to the coupling housing 12, the relative rotation of a conveying disc 6 relative to its pumping and control disc 5 leads to a pressure build-up in the associated pressure chamber 10, as a result of which the associated piston 4 is displaced towards the respective friction coupling 50. In this way, an independent locking effect is achieved for each axle shaft 2, i.e. for each driving gear. Spring means 74 which are supported on the coupling housing 12 and act indirectly on the piston 4 are able to influence the locking effect in a way known in itself; in this case, for example, in the sense of generating a counter force relative to the pressure force on the piston, which pressure force initially has to be overcome until a locking effect is built up as from a certain minimum speed differential between the coupling housing 12 and the axle shaft 2. If the spring means are arranged in a different way, it is possible, independently of a speed differential deviating from zero, to set a permanently existing basic locking effect of the coupling.

Figure 3B:
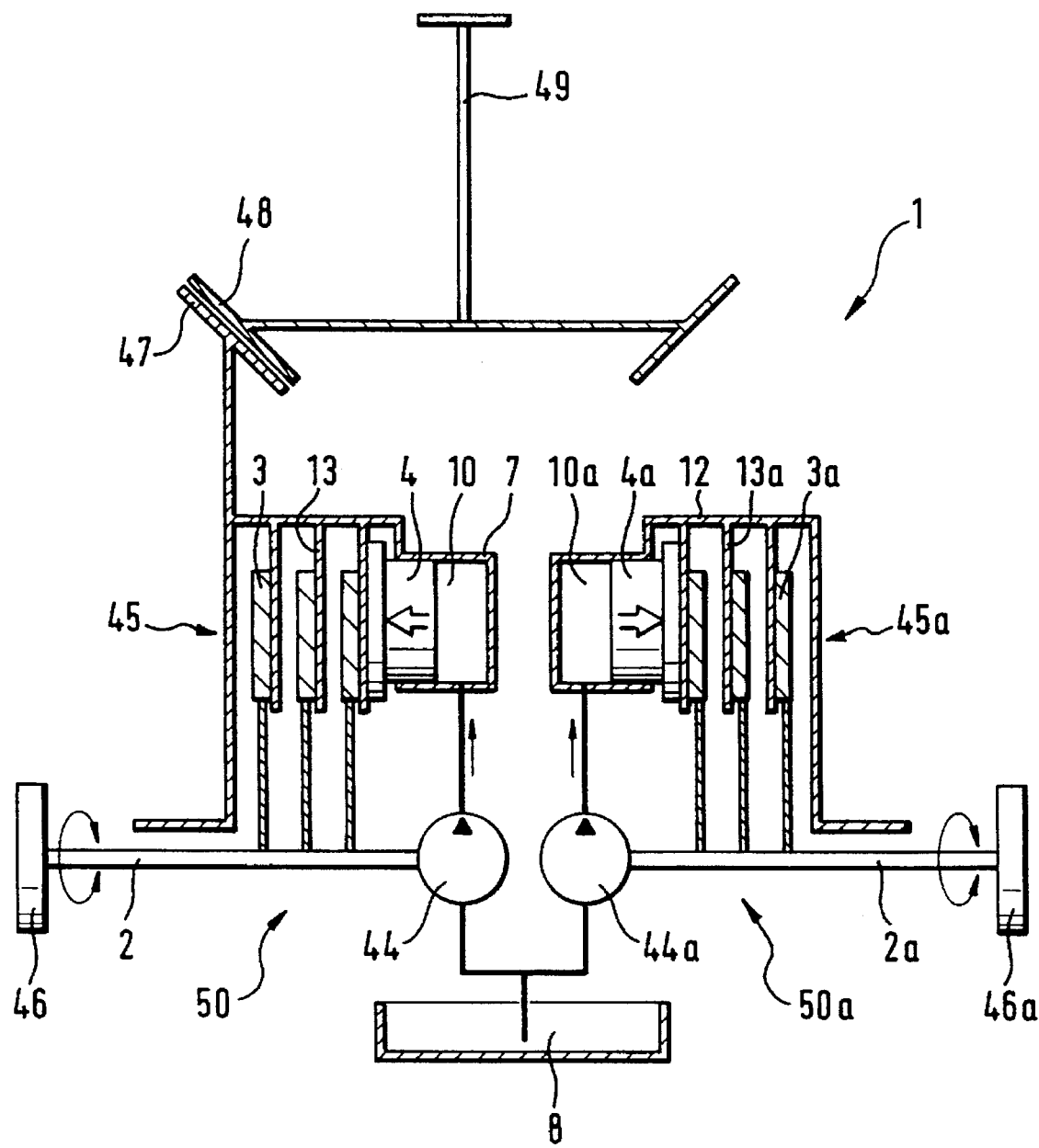

FIG. 3b, while using the same reference numbers, illustrates the respective parts symbolically in the diagram showing the operating principle. Friction couplings 45 are loaded by associated actuating devices 50 whose pressure generating elements, altogether, are referred to as the pump unit 44. In addition to the above-mentioned details, the driving gears 46 connected to the axle shafts 2 are illustrated symbolically; furthermore there is provided a driving pinion 47 at the coupling housing 12 which is driven via a bevel gear 48 by means of the propeller shaft 49 also indicated symbolically. The purpose of separate power arrows at the pistons 4 is to illustrate that the pump assemblies 44 operate independently of one another and load the pistons 4 independently of one another. In this way, a differential-speed-dependent locking effect is built up independently for each of the driving gears 46. The mode of operation is that of the usual so-called twin viscous coupling.

Figure 4A:
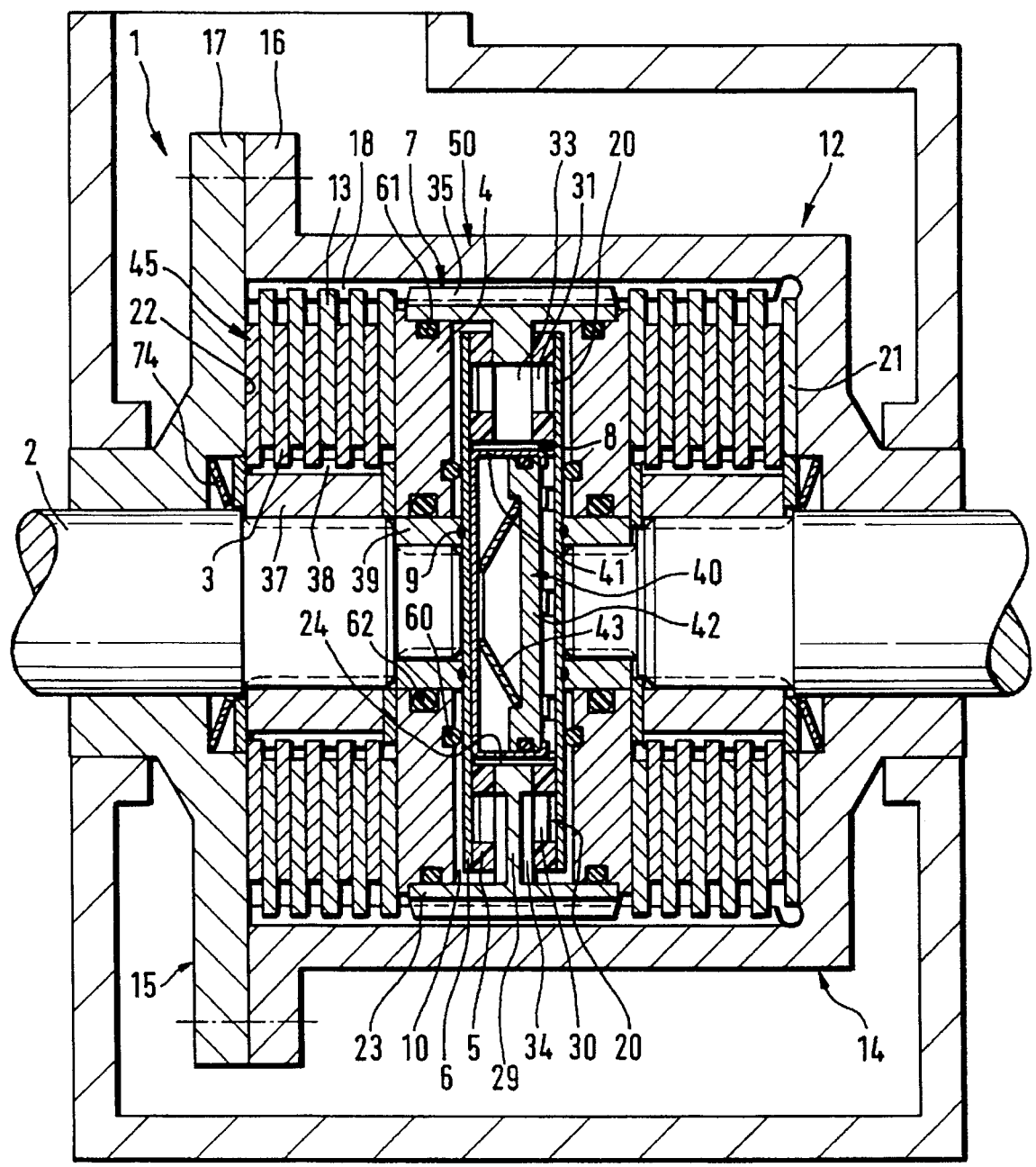
FIG. 4a is an axial section of a second embodiment of a device in accordance with the invention.

FIG. 4a shows a device 1 in accordance with the invention whose design largely corresponds to the embodiment according to FIG. 3a. Identical parts have been given identical reference numbers. Overall, reference is made to the description of FIG. 3a.

FIG. 4a deviates from FIG. 3a in that there are no axial securing means between the coupling housing 12 and the pump housing 7; i.e., a part corresponding to the securing pin 36 is missing. The toothing 18 in the carrier 14 of the coupling housing 12 and the toothing 35 at the pump housing 7 permit a relative axial displacement of the two parts relative to one another. This means that in the same way as explained above, a relative rotation of one of the axle shafts 2 relative to the coupling housing 12 leads to a pressure build-up in the associated pressure chamber 10. However, the reaction forces building up between the respective piston 4 and the pump housing 7 are not introduced into the coupling housing 12, but because the pump housing 7 is arranged so as to be axially floating, they generate an identical pressure-build-up in the second pressure chamber. For both axle shafts; i.e., for both driving gears there is built-up the same locking effect which is determined on the basis of the greater conveying pressure in one of the two pressure chambers; i.e., according to the greater of the two speed differentials existing at the axle shafts relative to the coupling housing, i.e. of the driving gears relative to the drive line.

Figure 4B:
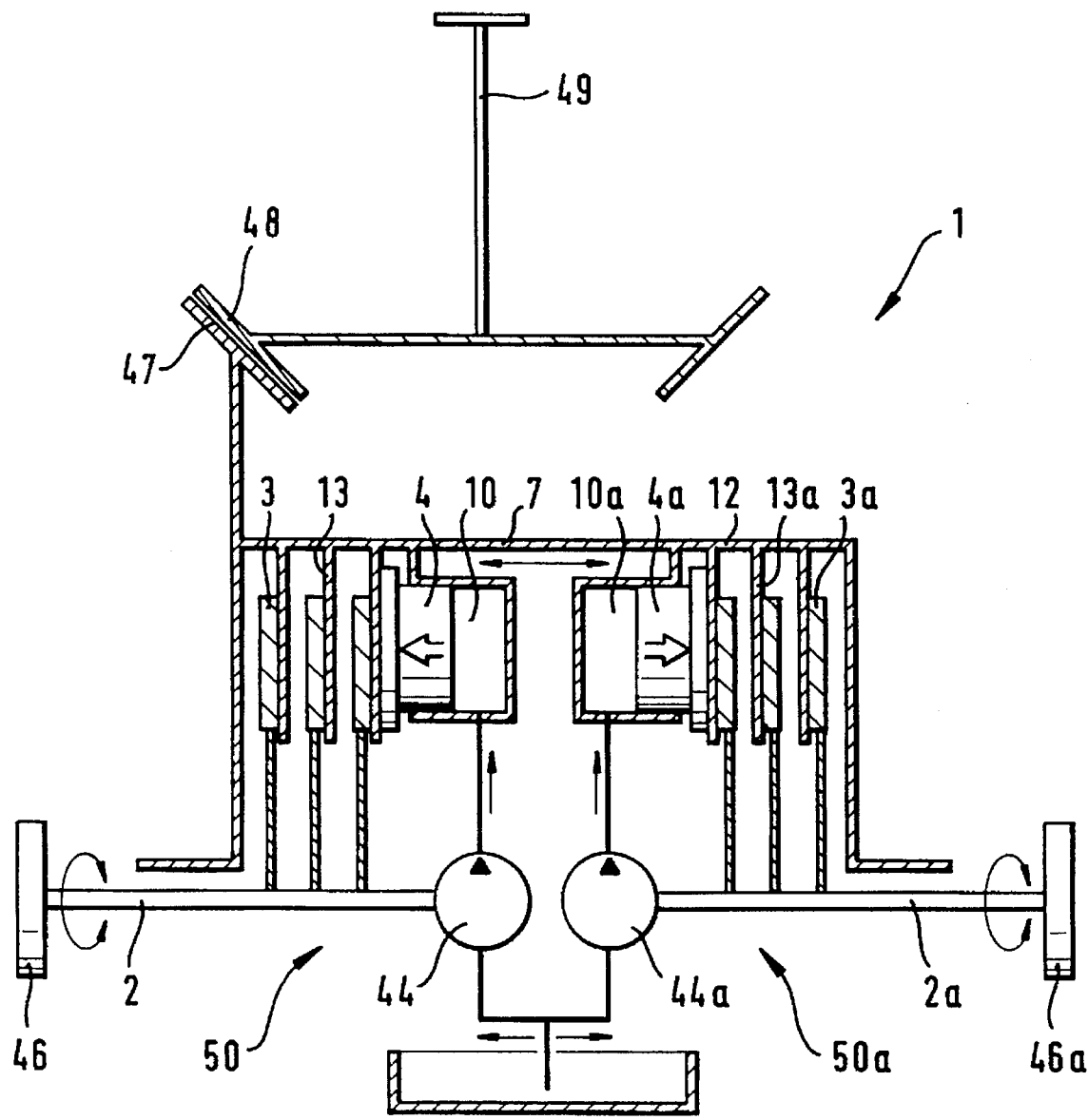

The illustration in FIG. 4b is similar to that of FIG. 3b and uses the same reference numbers. Overall, reference is made to the description of FIG. 3b. Double arrows associated with the pump housing 7 symbolize its axial movability relative to the coupling housing 12.

Figure 5A:
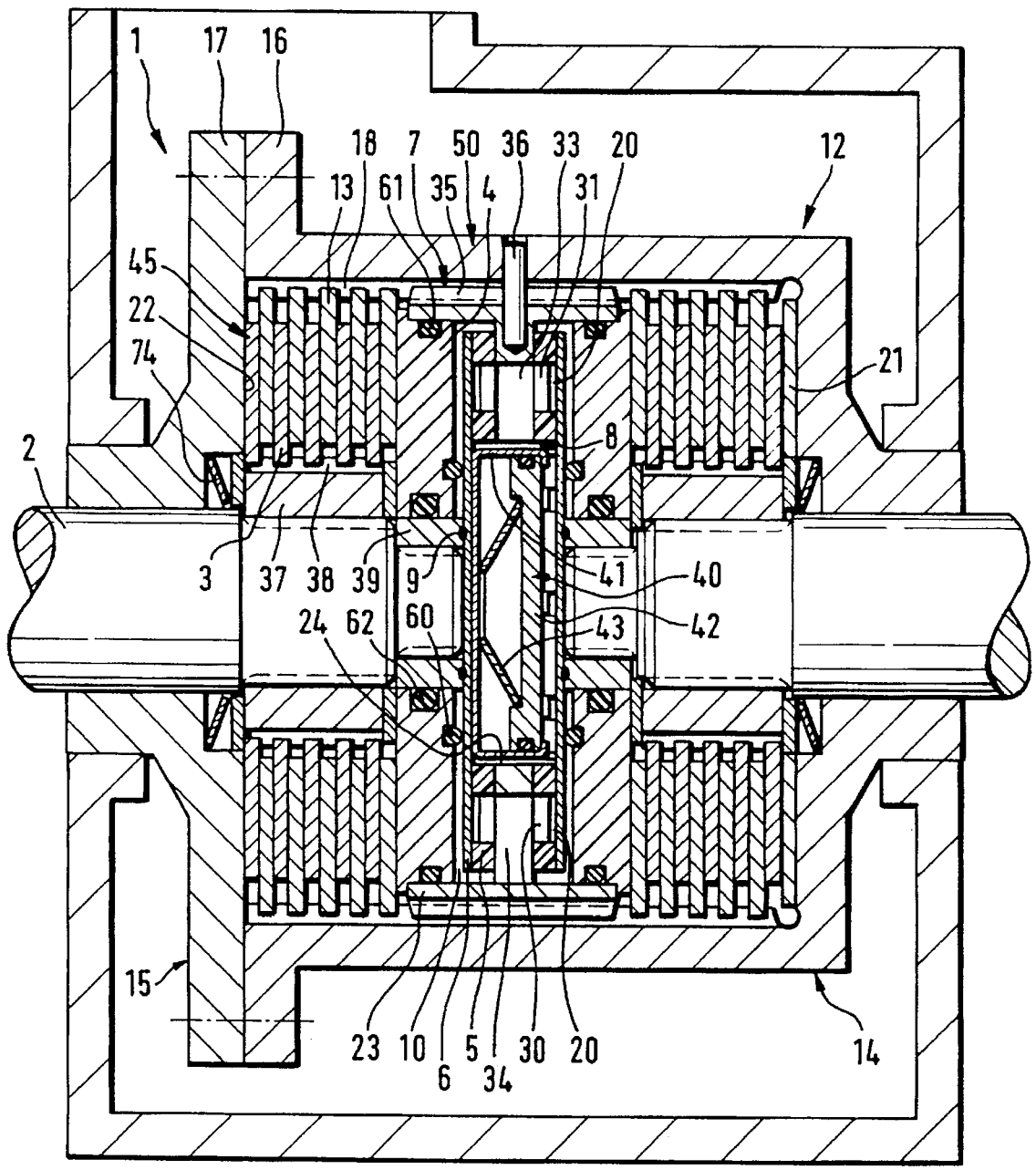
FIG. 5a is an axial section of a third embodiment of a device in accordance with the invention.

FIG. 5a shows a device 1 in accordance with the invention whose design is largely identical to the embodiment shown in FIG. 3a. Identical parts have been given identical reference numbers. Overall, reference is made to the description of FIG. 3a.

In FIG. 5a, as in FIG. 3a, a securing pin 36 axially secures the pump housing 7 relative to the coupling housing 12. FIG. 5a deviates from FIG. 3a in that not only the suction channel 33 (shown in section) of the channels 32, 33 is provided in the form of an aperture in the radial wall 29 of the pump housing 7, but also the pressure channel 34. This means that with every relative rotation between one of the axle shafts 2 and the coupling housing 12, a pressure build-up occurs in the respective pressure chamber 10, but that it also directly affects the second pressure chamber 10 and occurs therein, so that both pistons 4 are subjected to the same pressure which corresponds to a mean value of the pressure values of the two actuating assemblies 50; i.e., the same locking effect is built-up for both driving gears, which locking effect is determined on the basis of a mean conveying pressure in the pressure chambers, i.e. on the basis of a mean speed differential of the values of the two axle shafts relative to the coupling housing; i.e., of the driving gears relative to the drive line.

Figure 5B:
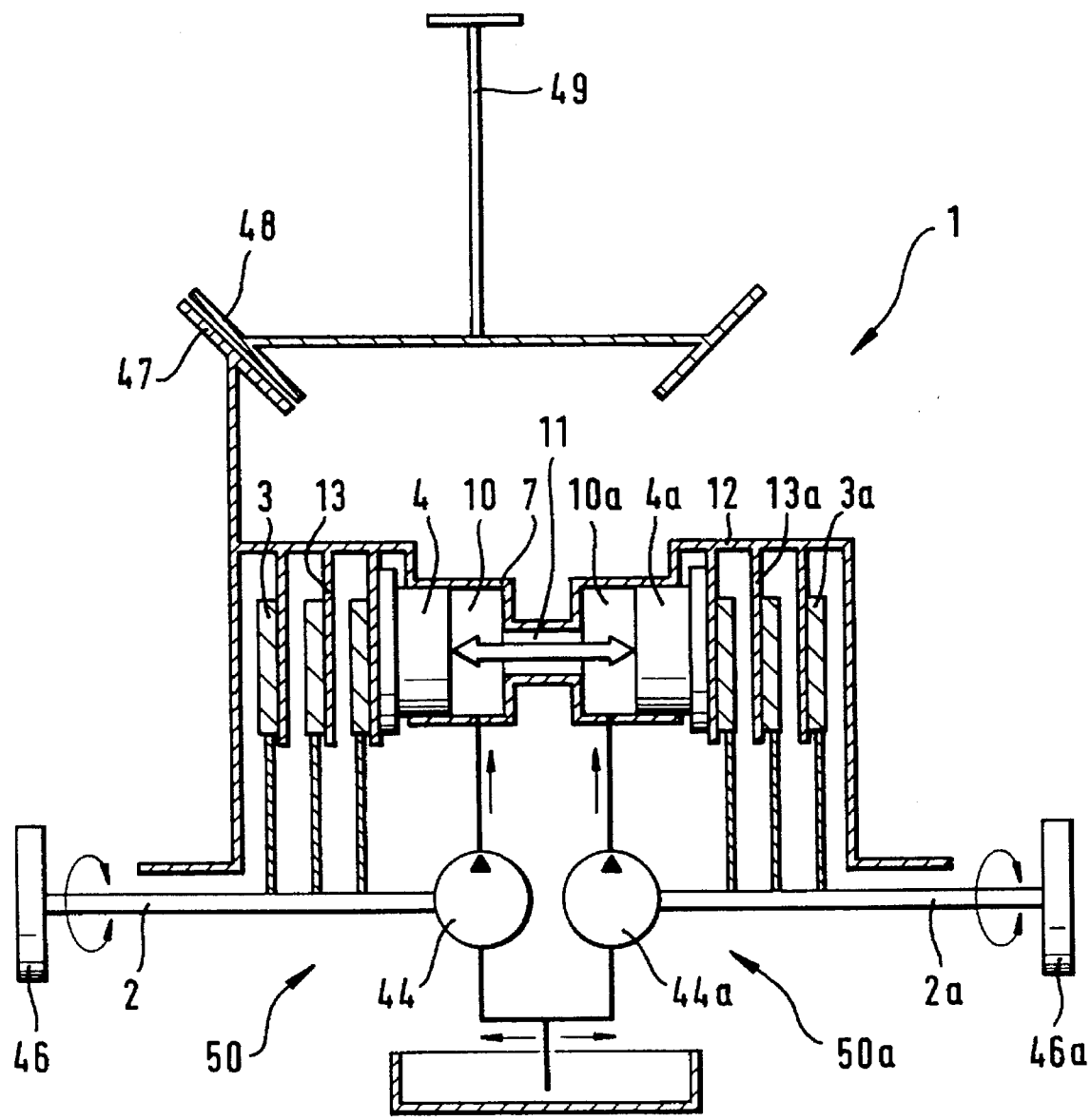

The embodiment shown in FIG. 5b is similar to that illustrated in FIG. 3b and carries the same reference numbers. FIG. 5b deviates from FIG. 3b in that the aperture in the housing wall constitutes the connecting channel 11. The connection of the power arrows at the pistons 4 refers to the formation of their mean value.

Figure 6A:
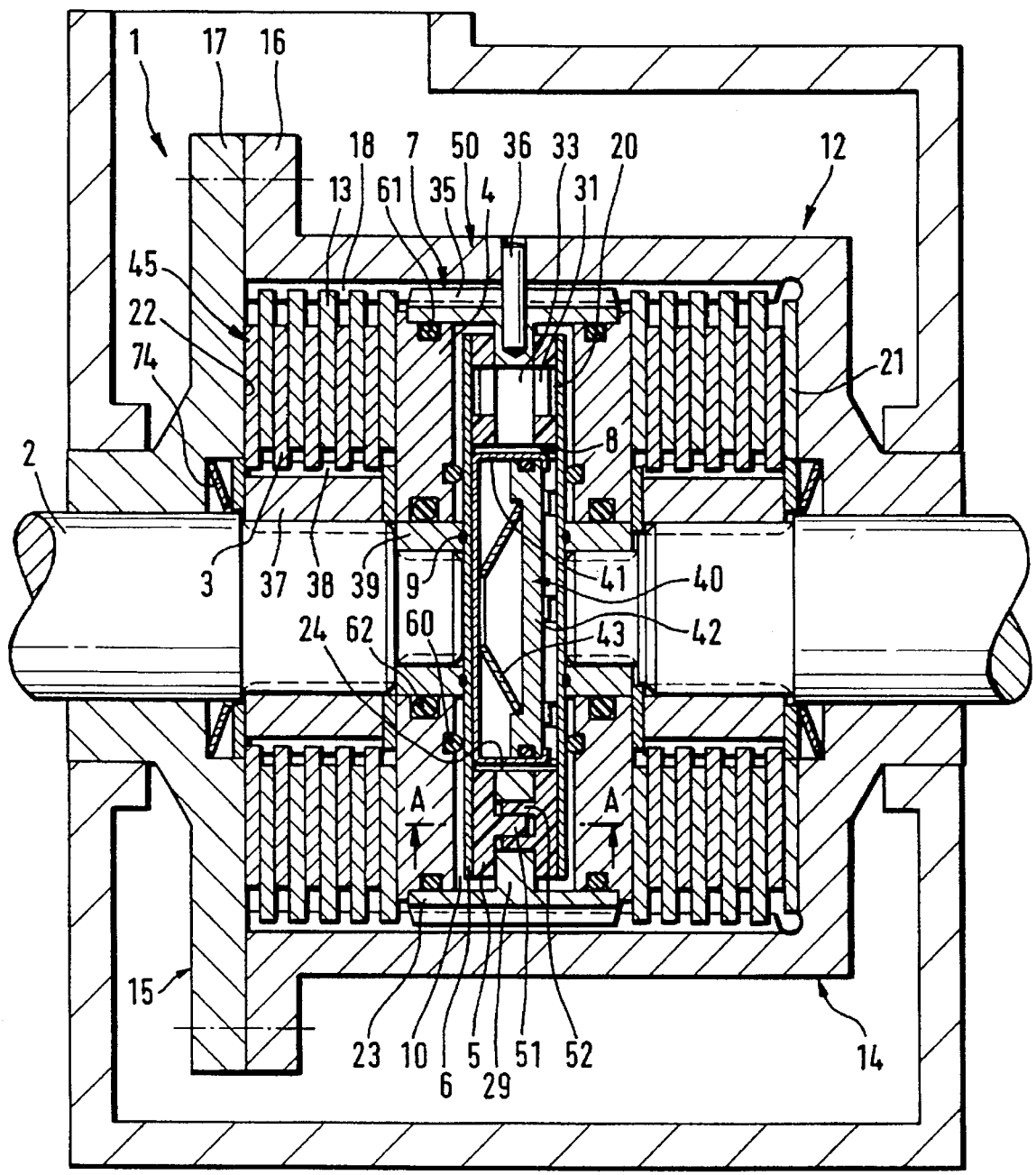
FIG. 6a is an axial section of a fourth embodiment of a device in accordance with the invention.
Figure 6A:
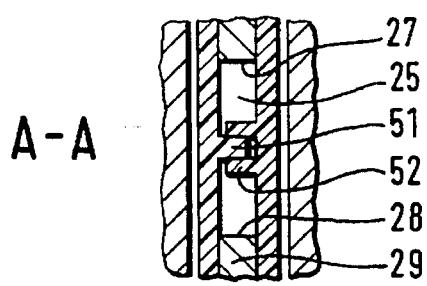

FIG. 6a shows a device 1 in accordance with the invention whose design is largely identical to that of the embodiment according to FIG. 3a. Identical parts have been given identical reference numbers. Overall, reference is made to the description of FIG. 3a.

As in FIG. 3a, the pump housing 7 is axially secured relative to the coupling housing 12 by a securing pin 36. Also, as in FIG. 5a, the pressure channels 34 form a joint open aperture, but the wall 29 is not shown in section in this radial plane. As is indicated by the section A—A in the detail, the circumferential stops 27, 28 are provided in a circumferential groove 25 in the housing wall 29, which circumferential groove 25 constitutes an aperture, and simultaneously, engaging means 51, 52 in the two pumping and control members pass through said circumferential groove 25 and non-rotatably connect the pumping and control members 5 to one another. This ensures that the coinciding rotational positions of the two pumping and control members 5 are forced to occur as a result of the positions of those members in whose shear channel 20 and on whose surfaces higher friction forces prevail relative to their conveying member 6; i.e., where there exists a higher relative speed between their axle shaft 2 and the coupling housing 12.

Whereas in the above-described embodiments there occurs a pressure-build-up in the respective pressure chamber or, if the pressure chambers are connected, in both pressure chambers in the case of every relative rotation of an axle shaft relative to the coupling housing, independently of the direction of relative rotation, the present device causes different functions depending on the directions of relative rotation of the two axle shafts relative to the coupling housing. If both axle shafts 2 rotate in the same direction relative to the coupling housing 12; i.e., in the case of straight line driving, the pumping and control discs 5 assume the same relative positions relative to the pump housing 7, without interfering with one another; i.e., in the case of both actuating devices 50 the apertures 30, 31 assume a functionally determined and purpose-related position relative to the suction and conveying channels 32, 33, 34. To that extent, the function is the same as that explained in connection with the embodiment according to FIG. 5a wherein the same locking effect is built up for both axle shafts, said locking effect being determined on the basis of a mean conveying pressure in the pressure chambers, i.e. on the basis of a mean speed differential of the values at the two axle shafts relative to the drive line.

If the two axle shafts rotate in different directions relative to the coupling housing 12, the pumping and control disc driven more forcefully by its conveying disc assumes its purpose-related and functionally determined position relative to the pump housing 7, whereas the second pumping and control disc is guided into a mis-position against the operating direction of its conveying disc, the result being that in the shear channel 20 of the respective pumping and control disc, pressure is removed from the joint pressure channel and, with the additional assistance of the respective conveying disc rotating in the opposite direction, returned into the reservoir. Both actuating devices are short-circuited so that an effective pressure build-up in the pressure chambers is not possible. This means that in sharp bends, for example, where the condition as described occurs, it is possible to prevent a locking effect from building up in order to avoid torsion and to reduce tire wear.

Figure 6B:
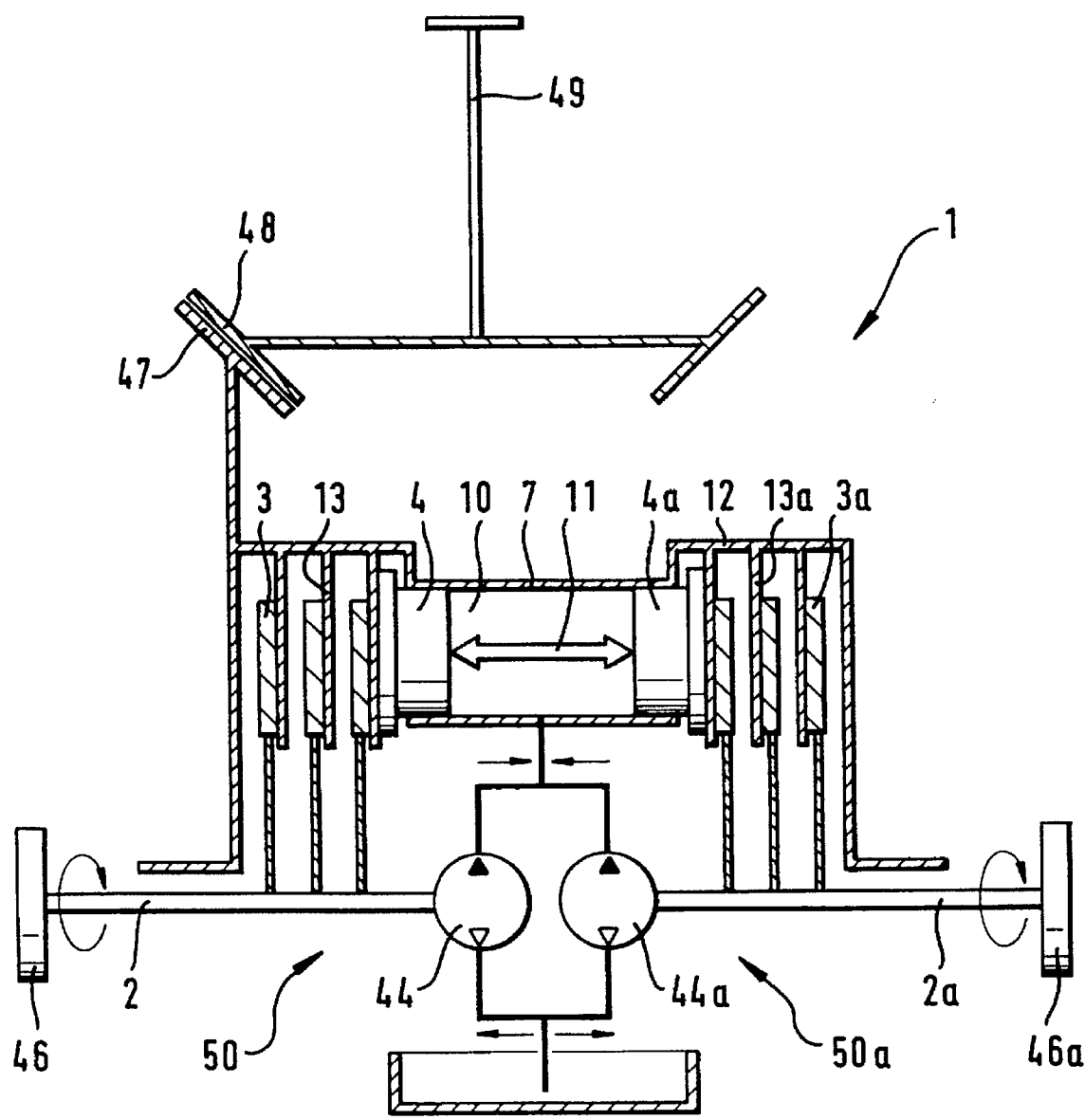
FIG. 6b is a diagram showing the operating principle of a device according to FIG. 6a, carrying out its first function.
Figure 6C:
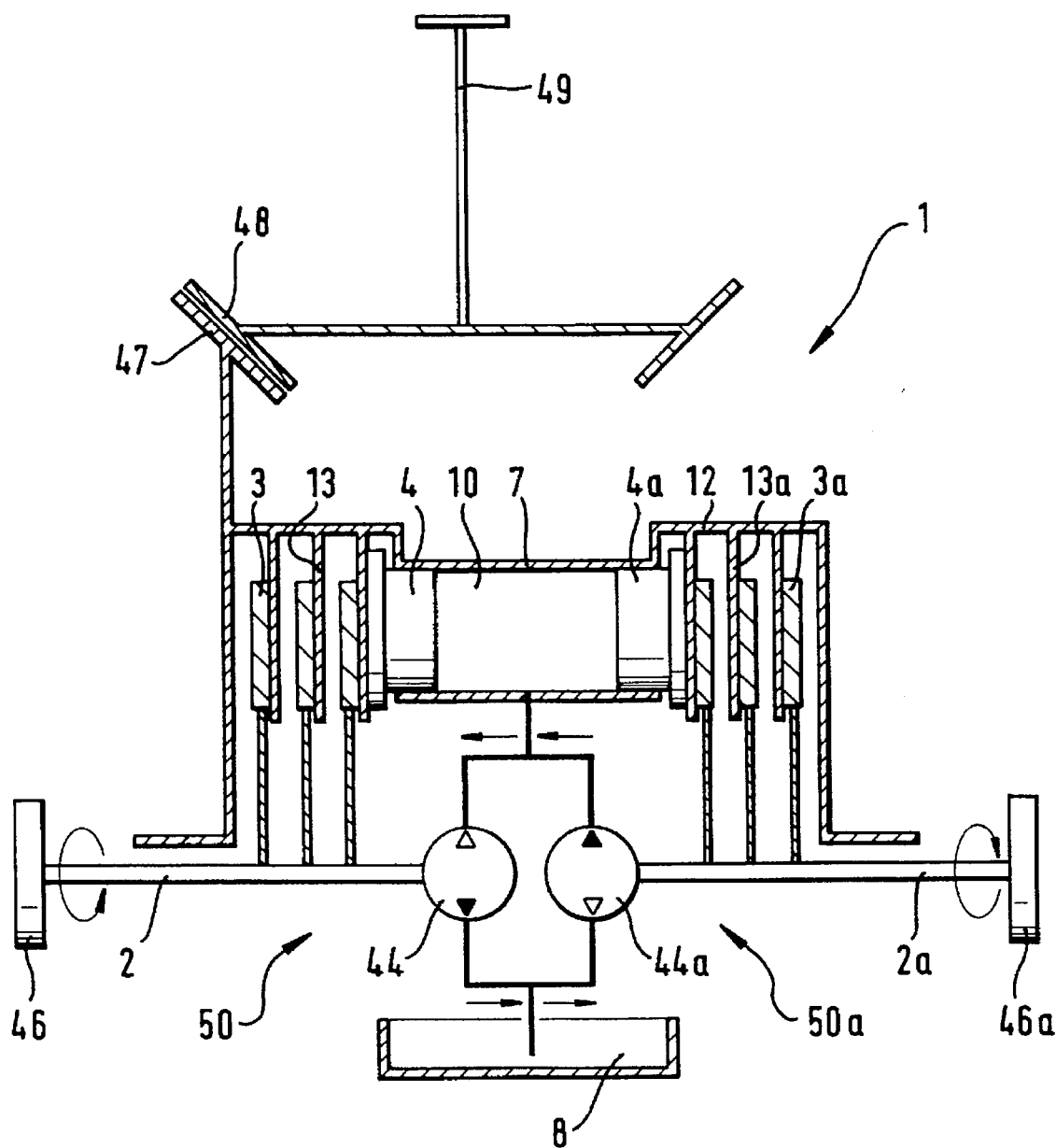
FIG. 6c is a diagram showing the operating principle of a device according to FIG. 6a, carrying out its second function.

The effect of this form of hydraulic and mechanical connection of the two actuating devices 50 is shown in the diagrammatic illustrations of FIGS. 6b and 6c.

FIG. 6b illustrates the case where both wheels 46 and both axle shafts 2 are driven in the same direction of rotation (clockwise) relative to the housing 12, and held back respectively. In this case, pressure builds up in both pressure chambers 10, which is symbolized by the triangles (extending in the same direction) in the pump assemblies 44. The pistons are each loaded with the same mean pressure which is symbolized by the connected double pressure arrow. The conveying directions are indicated by thin arrows.

FIG. 6c illustrates the case of different directions of relative rotation of the two wheels 46 and the two axle shafts 2 relative to the coupling housing 12 (axle shaft 2 rotating anti-clockwise, axle shaft 2a rotating clockwise). The two pump assemblies 44 are short-circuited crosswise by the channels 32, 33 and 34 respectively, as illustrated by the black triangles extending in opposite directions and by the thin arrows for the conveying direction, located in the circle. The pistons 4 are not pressure-loaded.

Figure 7A:
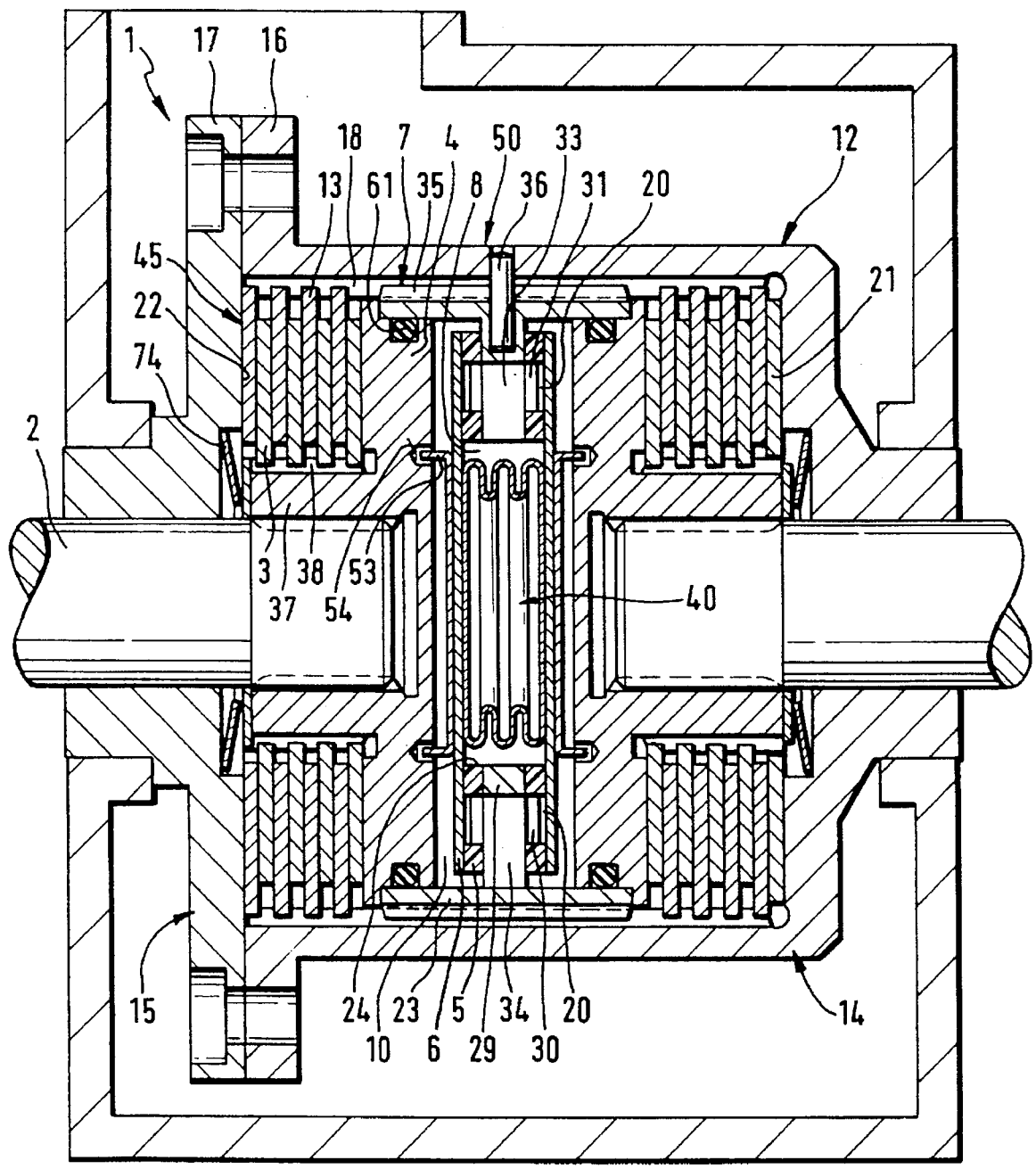
FIG. 7a is an axial view of a fifth embodiment of a device in accordance with the invention.

FIG. 7a shows a device in accordance with the invention which is largely identical to the above-mentioned embodiments, and, again, identical parts have been given the same reference numbers as those used for the description of FIG. 3a.

Again, as in FIG. 3a, the pump housing 7 is axially immovably secured relative to the coupling housing 12 by a securing pin 36. A uniform pressure build-up in both pressure chambers 10 is ensured by providing the pressure channel 34 in the form of an axial aperture in accordance with the embodiment shown in FIG. 5a.

In contrast to the above-described embodiments, the pistons 4, the hubs 37 and the hubs 39 are formed in one piece, so that in this case the pistons 4 are rotatable relative to the pump housing 7. The hubs 37 are arranged so as to be axially movable on the axle shafts.

The non-rotating connection of the conveying discs 6 relative to the hub 37 is ensured by bent plate metal projections 53 engaging circumferentially limited recesses 54 in the pistons 4.

In this embodiment, the volume balancing element 40 in the balancing chamber 8 is provided in the form of a sealed convoluted boot 57.

Figure 7B:
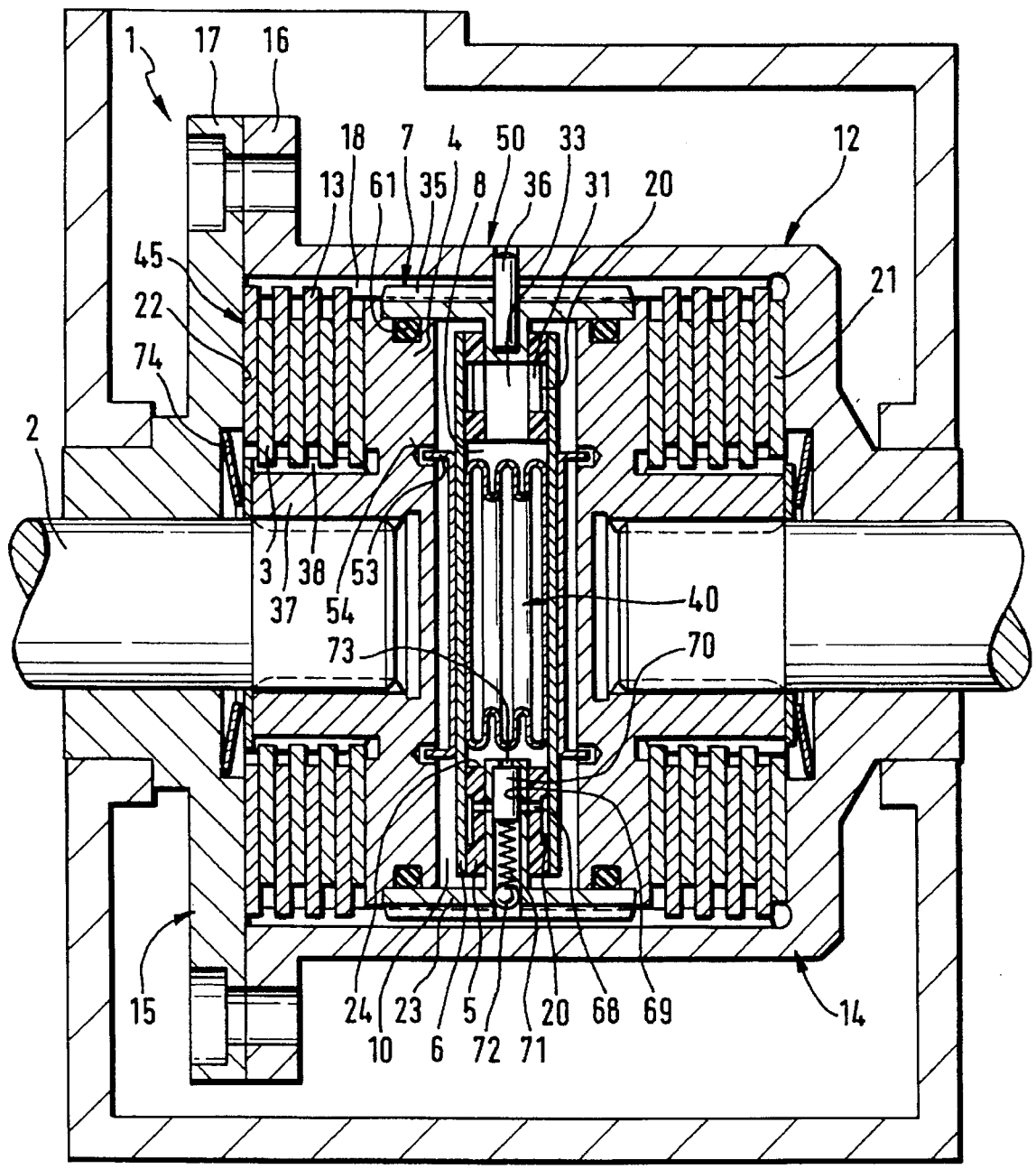
FIG. 7b shows the device according to FIG. 7a with a further detail.

FIG. 7b shows a device in accordance with the invention which is largely identical to that shown in FIG. 7a, and identical parts have been given the same reference numbers as those used in FIG. 3a. As in the case of FIG. 7a, it has to be assumed that the pressure channels 34 are provided in the form of a joint open aperture, but the wall 29 is not shown in section in this radial plane. The shear channels 20 are provided with control apertures 68 ending in a radial bore 69 in the wall 29. In the latter there is arranged a valve member 70 so as to be radially movable; it is supported on a spring 71 held by a closing ball 72. Normally, the valve member 70, in the position as illustrated, closes a valve aperture 73. The coupling carries out its usual function. At high speeds of the pump housing 7, the valve member 70, independently of the relative speed of the coupling components, lifts off the valve aperture 73 and thus achieves a short-circuit connection between the shear channels 20 and the reservoir 8. In this way it is ensured that at high vehicle speeds, the coupling is unable to build up a locking effect, which is essential from the point of view of driving safety.

Figure 8A:
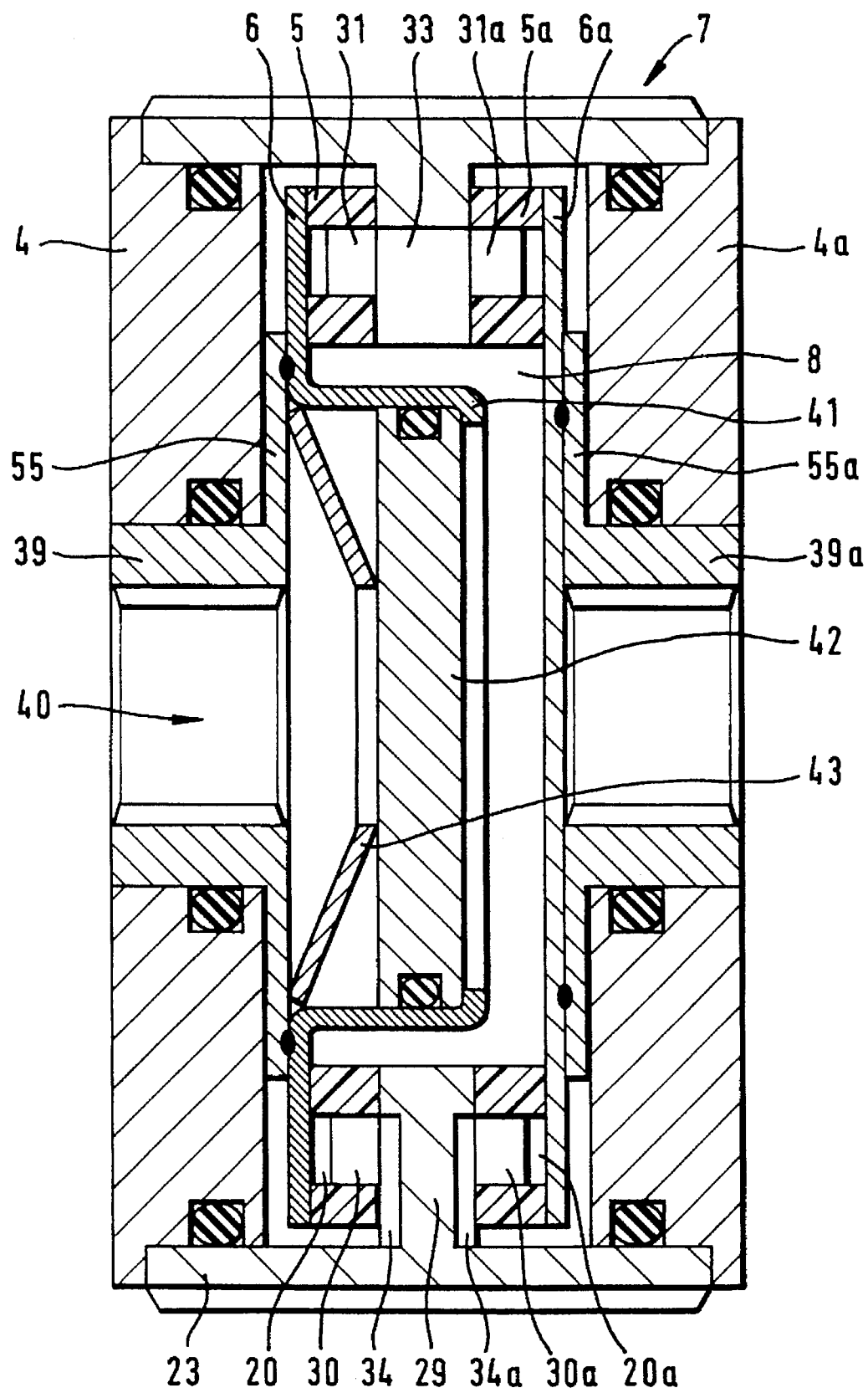
FIG. 8a shows a first modified embodiment of an actuating device in the form of a detail.

FIG. 8a shows a double actuating device similar to the embodiments according to FIGS. 3a, 4a, 5a and 6a. It illustrates the pump housing 7, the pistons 4 and the hubs 39. In accordance with the embodiments to FIGS. 3a and 4a, the radial wall 29 of the pump housing 7 is provided with separate pressure channels 34. In slight contrast to the above-mentioned Figures, the hubs 39 each comprise a flange 55 by means of which the conveying members 6 are firmly connected. In contrast to the above-mentioned embodiments, the conveying disc 6 illustrated on the left constitutes an annular disc and at the same time the housing 41 of the volume balancing element 40. Accordingly, the plate spring 43 is supported directly on the flange 55. The plate spring 43 acts on the piston 42 which is able to compensate for changes in the size of the pressure chambers and thus of the reservoir 8 by axial displacement.

Figure 8B:
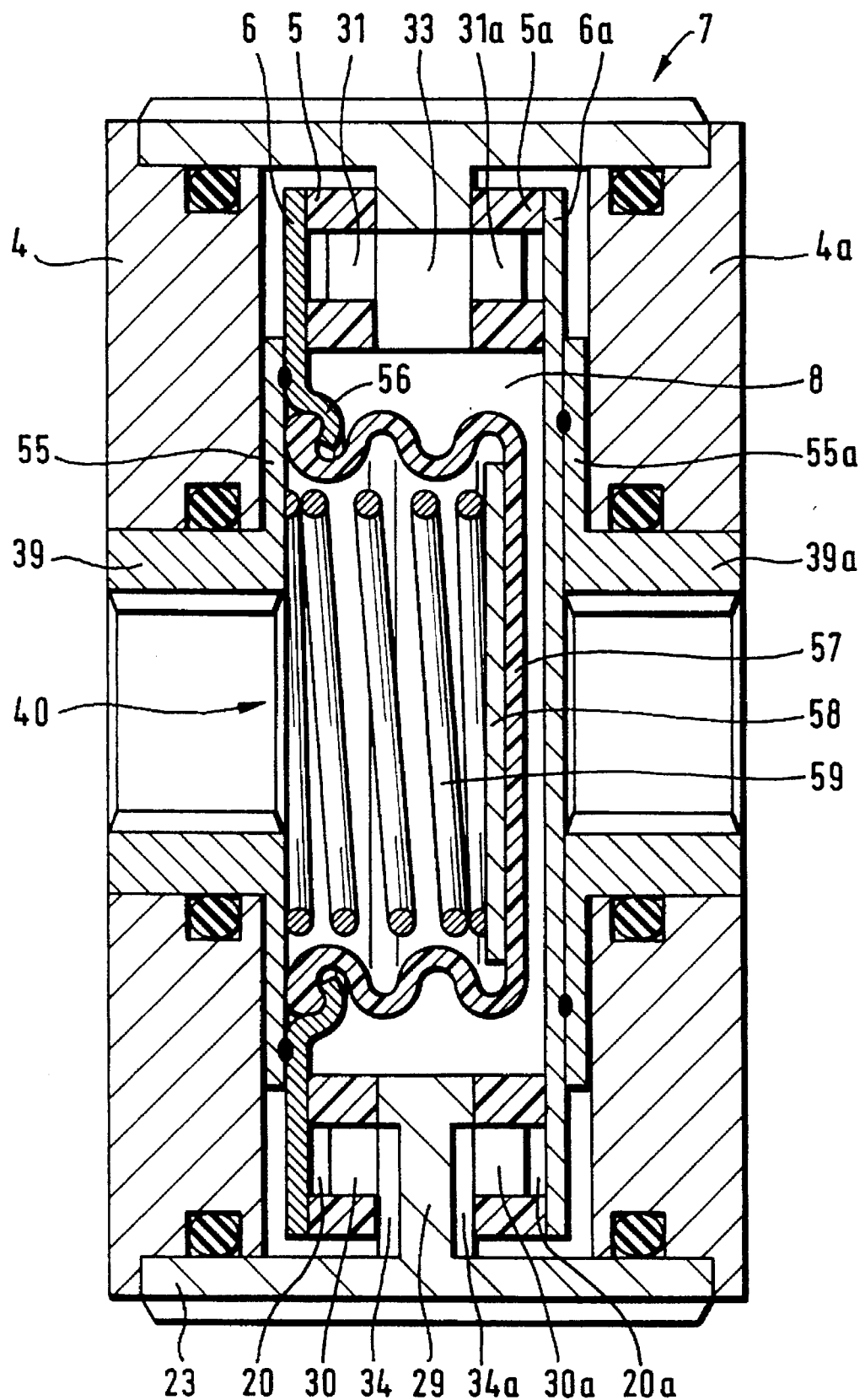
FIG. 8b shows a second modified embodiment of an actuating unit.

FIG. 8b shows a double actuating device which, in principle, corresponds to those shown in FIGS. 3a, 4a, 5a, 6a and which, again, comprises the pump housing 7, the pistons 4 and the hubs 39. Again, the hubs 39 are provided with flanges 55 by means of which the conveying members 6 are firmly connected. The conveying member 6 is not provided in the form of a closed member, but comprises an inner bead 56 which secures a unilaterally open rubber-resilient convoluted boot 57 relative to the flange 55. Inside the convoluted boot 57 there is arranged a disc 58 and a helical spring 59 which is supported on the flange 55 of the hub 39 shown on the left. The convoluted boot 57 is thus able, resiliently, to compensate for changes in the size of the pressure chambers and thus of the reservoir 8.

Figure 8C:
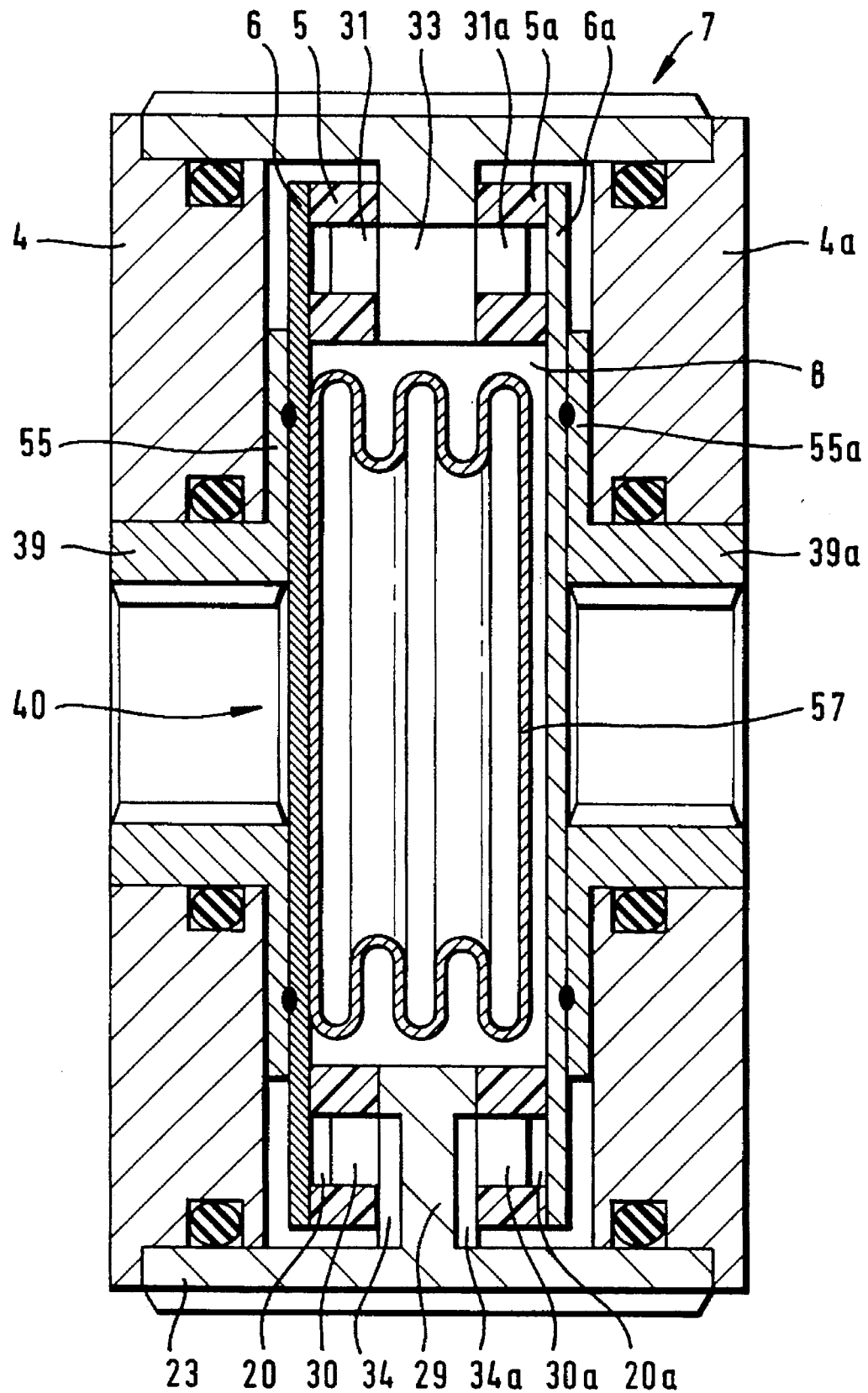
FIG. 8c shows an operating device according to FIGS. 7a and 7b in the form of an enlarged detail.

FIG. 8c shows a double actuating device which substantially corresponds to those illustrated in FIGS. 3a, 4a, 5a and 6a, but with the detail of the volume balancing element corresponding to the illustration of FIG. 7. It is thus possible to identify the pistons 4, the pump housing 7 and the hubs 39.

Again, the hubs 39 comprise flanges 55 by means of which the conveying discs 6 are firmly connected. Again, the radial housing wall 29 is provided with individual pressure channels 34. As in the above-mentioned Figures, the conveying discs 6 are continuous, entirely radial, closed discs. A volume balancing element 40 provided in the form of a boot-shaped metallic can member is firmly connected to the disc illustrated on the left. As a result of compression, any change in volume in the pressure chambers and thus in the reservoir 8 compensated for.

What is claimed is:

1. An axle drive for distributing torque from a propeller shaft to two axle shafts, having a coupling housing which is drivable by the propeller shaft and which, in turn, is rotatably supported in a drive housing, having two torque transmitting friction couplings which are provided to drive the axle shafts and which are arranged in the coupling housing, with first friction plates of each coupling being non-rotatably connected to the coupling housing and second friction plates of each coupling being non-rotatably connected to the respective axle shaft, and having two actuating devices for the two friction couplings, including:

a common pump housing which is non-rotatably connected to the coupling housing;

two symmetrically arranged pistons axially movable within the pump housing, each of which delimit one end of a pressure chamber which is filled with a highly viscous fluid and connected to a reservoir;

the pressure chambers each contain pumping and control members which are rotatable to a limited extent relative to the pump housing between two end positions; and that in each of the pressure chambers there are arranged conveying members which are each non-rotatably connected to one of the axle shafts; that respective rotational faces of a conveying member, together with counter faces of a pumping and control member, constitute at least one sealed shear channel which is formed by a groove extending circumferentially between two ends in the pumping and control member, and by a surface of the conveying member covering same;

the reservoir contained in the pump housing being connectable to the respective pressure chamber by means of suction channels and pressure channels arranged in the pump housing and by means of control apertures respectively arranged at the ends of the groove in the pumping and control member in such a way that in both the two end positions of a pumping and control member, the respective control aperture arranged in a direction of relative rotation at a front end of the groove communicates with the reservoir and the control aperture arranged in the direction of relative rotation at a rear end of the groove communicates with the pressure chamber, so that in the shear channel a conveying action takes place from the reservoir to the pressure chamber.

2. A drive according to claim 1, wherein there is provided a common reservoir for supplying both pressure chambers in the pump housing.

3. A drive according to claim 1, wherein the pistons each rotate with the pump housing.

4. A drive according to claim 3, wherein the conveying members are each non-rotatably connected to hubs which are slid on to the axle shafts and non-rotatably connected thereto.

5. A drive according to claim 1, wherein the pistons are each non-rotatably connected to the conveying members and rotate therewith.

6. A drive according to claim 5, wherein the pistons are integrally connected to hubs which are slid on to the axle shafts and non-rotatably connected thereto.

7. A drive according to claim 1, wherein the pressure chambers of the two actuating devices are sealed relative to one another.

8. A drive according to claim 1, wherein the pressurized chambers of the two actuating devices are hydraulically connected to one another.

9. A drive according to claim 8, wherein the pumping and control members of the two actuating devices are rotationally mechanically connected to one another.

10. A drive according to claim 1, wherein the pump housing is arranged so as to be axially floating in the coupling housing.

11. A drive according to claim 1, wherein the pump housing is arranged so as to be axially fixed in the coupling housing.

12. A drive according to claim 1, wherein there are provided spring means for pressing the conveying members and pumping and control members axially against one another.

13. A drive according to claim 12, wherein said spring means comprise resilient rubber o-rings.

14. A drive according to claim 1, wherein the shear channels are each formed by grooves in radial faces of disc-shaped pumping and control members and by contacting radial faces of disc-shaped conveying members.

15. A drive according to claim 1, wherein the control apertures at the ends of the grooves are provided in a form of axial bores in disc-shaped pumping and control members which extend from their one end faces sealingly resting against a radial housing wall in the pump housing to the grooves positioned in the opposed second end faces, with said second end faces sealingly contacting end faces of the respective conveying members; that the suction channels from the reservoir to the shear channel are provided in a radial housing wall and extend as far as the grooves and that in each end position of the pumping and control member only one of the control apertures overlaps with a suction channel; and that there are formed pressure channels from the shear channel to the pressure chamber in a radial housing wall of the pump housing, which pressure channels, in each of the two end positions, overlap with only one of the two control apertures.

16. A drive according to claim 1, wherein for the purpose of achieving a characteristic which is asymmetric as a function of the direction of rotation, there is provided a respective additional control aperture in each of the pumping and control members, by means of which an intermediate portion of the length of the respective shear channel communicates with the reservoir in only one of the two end positions.

17. A drive according to claim 16, wherein the further control aperture is provided in a form of an axial bore in each of disc-shaped pumping and control members, which control aperture ends in an intermediate portion of the groove and which, in only one of the end positions, overlaps with an additional connecting channel leading to the reservoir.

18. A drive according to claim 1, wherein for the purpose of achieving a characteristic which is asymmetric as a function of the direction of rotation, there is provided a respective additional control aperture in each of the pumping and control members, by means of which an intermediate portion of the length of the respective shear channel communicates with the pressure chamber in only one of the two end positions.

19. A drive according to claim 18, wherein the further control aperture is provided in a form of an axial bore in each of disc-shaped pumping and control members, which control aperture ends in an intermediate portion of the groove and which, in only one of the end positions, overlaps with an additional connecting channel leading to the pressure chamber.

20. A drive according to claim 1, wherein a rotary stop at each of the pumping and control members engages a groove which is provided in the pump housing and whose circumferential length is limited.

21. A drive according to claim 1, wherein there are provided spring means which are supported on the coupling housing and load the pistons with a counter-force.

* * * * *

UNITED STATES PATENT AND TRADEMARK OFFICE
CERTIFICATE OF CORRECTION

PATENT NO. : 5,632,185
DATED : May 27, 1997
INVENTOR(S) : Theodore GaSSmann

It is certified that error appears in the above-identified patent and that said Letters Patent is hereby corrected as shown below:

On the Title page, item [19] and [75] delete "Gassmann" insert --GaSSmann--.

Column 7, Line 45, delete "fight" insert --right--.

Signed and Sealed this

Twentieth Day of January, 1998

Attest:

BRUCE LEHMAN

Attesting Officer

Commissioner of Patents and Trademarks